US009667923B2

(12) United States Patent
Tanizumi et al.

(10) Patent No.: US 9,667,923 B2
(45) Date of Patent: May 30, 2017

(54) CAMERA ATTITUDE DETECTION DEVICE AND WORK REGION LINE DISPLAY DEVICE

(71) Applicant: TADANO LTD., Kagawa (JP)

(72) Inventors: Kazuya Tanizumi, Kagawa (JP); Iwao Ishikawa, Kagawa (JP); Kazuaki Tsuda, Kagawa (JP); Hiroshi Yamauchi, Kagawa (JP); Keisuke Tamaki, Kagawa (JP); Masayuki Munekiyo, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 14/892,833

(22) PCT Filed: May 19, 2014

(86) PCT No.: PCT/JP2014/063229
§ 371 (c)(1),
(2) Date: Nov. 20, 2015

(87) PCT Pub. No.: WO2014/189009
PCT Pub. Date: Nov. 27, 2014

(65) Prior Publication Data
US 2016/0119589 A1 Apr. 28, 2016

(30) Foreign Application Priority Data

May 21, 2013 (JP) .................................. 2013-107027
May 16, 2014 (JP) .................................. 2014-102874

(51) Int. Cl.
*H04N 7/18* (2006.01)
*B66C 13/46* (2006.01)
(Continued)

(52) U.S. Cl.
CPC ............. *H04N 7/183* (2013.01); *B66C 13/16* (2013.01); *B66C 13/46* (2013.01); *G06F 3/0412* (2013.01); *G06F 3/1407* (2013.01); *H04N 5/232* (2013.01)

(58) Field of Classification Search
None
See application file for complete search history.

(56) References Cited

U.S. PATENT DOCUMENTS

2009/0129630 A1* 5/2009 Gloudemans ........... G06T 15/20
382/103
2013/0013144 A1* 1/2013 Tanizumi .............. B66C 23/905
701/34.4

FOREIGN PATENT DOCUMENTS

JP 3440598 8/2003
JP 2011-207571 10/2011
JP 2013-18580 1/2013

* cited by examiner

*Primary Examiner* — James M Anderson, II
(74) *Attorney, Agent, or Firm* — Paratus Law Group, PLLC

(57) ABSTRACT

There is provided a monitoring camera (32) at a tip of a boom, a monitor (70) configured to display a captured image of a hook suspended from the tip of the boom, an attitude angle calculation device (68) configured to calculate, based on hook image position information on a screen displayed on the monitor (70) and hook position information in a real space, an attitude angle of the camera, and the attitude angle calculation device (68) includes a hook position calculation unit (63) configured to calculate a hook position on the screen actually displayed on the monitor (70), a shift amount calculation unit (64) configured to calculate the distance between the hook position calculated by the hook position calculation unit (63) and a reference hook position of the hook on the screen displayed on the monitor (70) when it is assumed that the camera faces directly downward, and a (Continued)

camera inclination angle calculation unit (65) configured to calculate an inclination angle of the monitoring camera (32) based on the difference and a distance in a height direction from an optical axis center position of the monitoring camera (32) to the hook.

16 Claims, 22 Drawing Sheets

(51) Int. Cl.
    *B66C 13/16*     (2006.01)
    *G06F 3/041*     (2006.01)
    *G06F 3/14*     (2006.01)
    *H04N 5/232*     (2006.01)

OFFSET AMOUNT IS CHANGED
BEFORE AND AFTER MOVEMENT

ROTATING SHAFT OF CAMERA DOES NOT
COINCIDE WITH CENTER OF SHEAVE AT BOOM TIP

ROTATING SHAFT OF CAMERA COINCIDES
WITH CENTER OF SHEAVE AT BOOM TIP

CAMERA ATTITUDE DETECTION DEVICE AND WORK REGION LINE DISPLAY DEVICE

CROSS REFERENCE TO PRIOR APPLICATION

This application is a National Stage Patent Application of PCT International Patent Application No. PCT/JP2014/063229 (filed on May 19, 2014) under 35 U.S.C. §371, which claims priority to Japanese Patent Application Nos. 2014-102874 (filed on May 16, 2014) and 2013-107027 (filed on May 21, 2013), which are all hereby incorporated by reference in their entirety.

TECHNICAL FIELD

The present invention relates to a camera attitude detection device and a work region line display device which calculate an attitude angle of a camera without using an inclination angle detection sensor.

BACKGROUND ART

Conventionally, there has been known a suspended load position detection device in which a camera is provided at a tip of a boom (see Patent Literature 1).

In the suspended load position detection device, a camera is provided at a tip of a boom, an image of a suspending rope and a hook is captured with the camera from above, a rope point where the color of the suspending rope exists is calculated for each scanning line from the color distribution on a plurality of the scanning lines in the captured image by image processing, each of the rope points is joined by a straight line, and an intersection point of the straight lines corresponding to the suspending rope is calculated as a suspended load position.

CITATION LIST

Patent Literature

Patent Literature 1: JP 3440598 B

SUMMARY OF THE INVENTION

Problems to be Solved by the Invention

Incidentally, in the suspended load position detection device, since an inclination angle detection sensor to detect an inclination angle of the camera is not provided, the precise position of the suspended load cannot be calculated when the camera inclines, and there is a problem that the suspended load position detection device is expensive when the inclination angle detection sensor is provided.

An object of the present invention is to provide a camera attitude detection device which can detect an attitude angle of a camera without providing an inclination angle detection sensor, and a work region line display device using the camera attitude detection device.

Solutions to Problems

An invention of claim 1 is a camera attitude detection device including: a camera provided at a tip of a boom of a working machine; a monitor configured to display an image, captured by the camera, of a hook suspended from the tip of the boom; and an attitude angle calculation device configured to calculate, based on hook image position information on a screen displayed on the monitor and hook position information in a real space, an attitude angle of the camera.

Effects of the Invention

According to the present invention, it is possible to detect an attitude angle of a camera without providing an inclination angle detection sensor.

DESCRIPTION OF EMBODIMENTS

Hereinafter, embodiments of a camera attitude detection device and a work region line display device according to the present invention will be described with reference to the drawings.

First Embodiment

Figure 1:
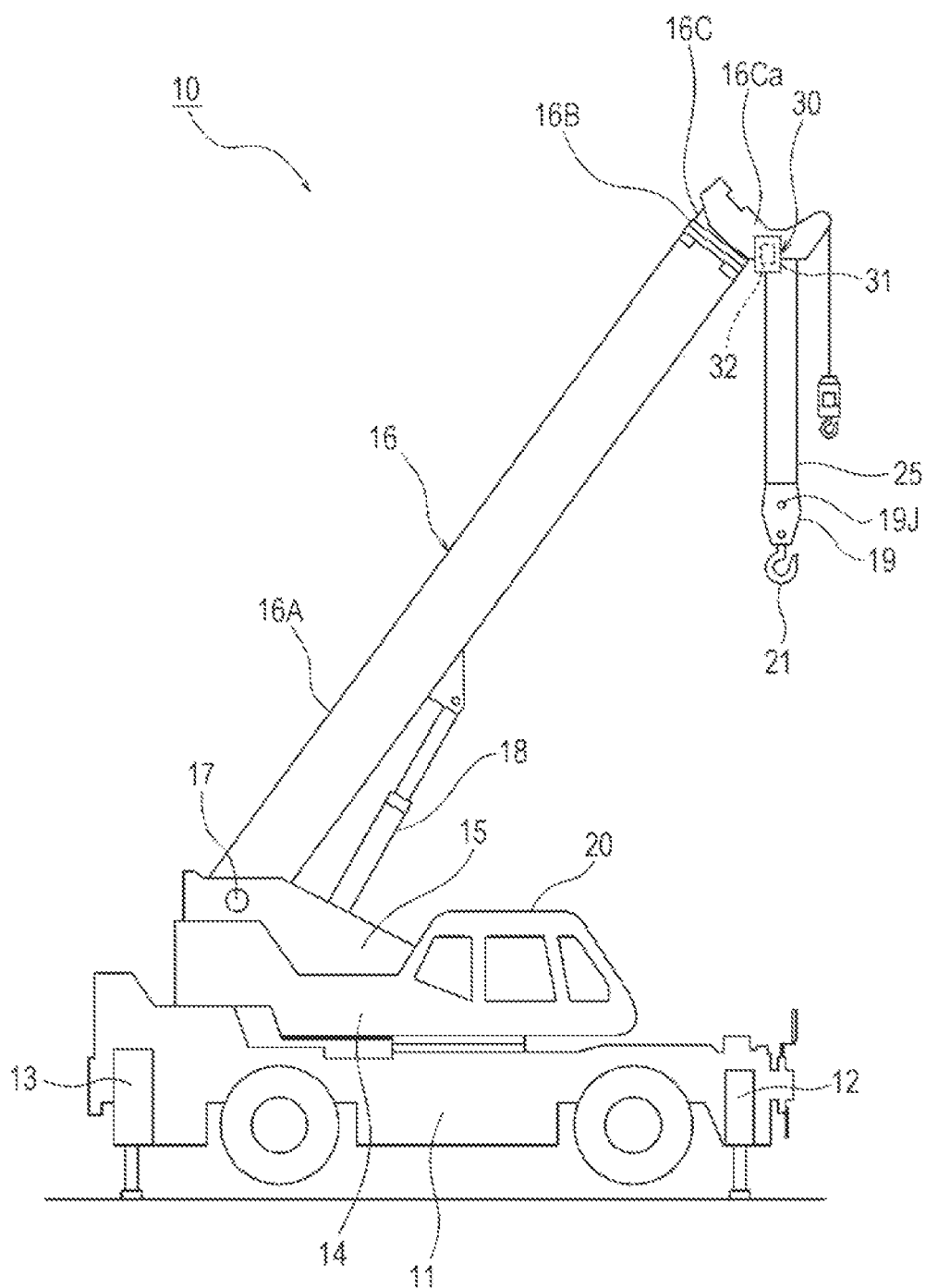
FIG. 1 is a side view illustrating a mobile crane equipped with a work region line display device according to the present invention.

FIG. 1 illustrates a rough terrain crane 10 as a crane (working vehicle) which is a working machine equipped with a work region line display device including a camera attitude detection device. The rough terrain crane 10 (hereinafter, referred to as a crane) includes a carrier 11 which is a main body of a vehicle having a traveling function, a pair of right and left front side outriggers 12 which is provided at a front side of the carrier 11, a pair of right and left rear side outriggers 13 which is provided at a rear side of the carrier 11, a swivel base 14 horizontally swivelably mounted on a upper part of the carrier 11, a cabin 20 provided on the swivel base 14, and a telescopic boom 16 mounted on a bracket 15 fixed to the swivel base 14.

The telescopic boom 16 is mounted, by a base end thereof, through a supporting shaft 17 and is derrickably about the supporting shaft 17. A derricking cylinder 18 is interposed between the bracket 15 and the telescopic boom 16, and the telescopic boom 16 performs derricking movements by expansion/contraction of the derricking cylinder 18.

The telescopic boom 16 includes a base boom 16A, an intermediate boom 16B, and a top boom 16C, and is configured in the base boom 16A by telescopically assembling them in this order from the outside to the inside. Furthermore, the telescopic boom 16 expands and contracts by an extension cylinder (not illustrated).

A sheave 23 (see FIG. 5) is provided at a tip of the top boom 16C, a wire rope 25 (hereinafter, referred to as a wire) is hung on the sheave 23, and a hook block 19 is suspended by the wire 25. A hook 21 is mounted on the hook block 19.

The wire 25 is wound or drawn out by a winch, which is not illustrated.

A camera unit 30 is mounted on the tip of the top boom 16C.

The camera unit 30 includes a housing 31 mounted on the tip of the top boom 16C through a damper so as to continuously face downward by its own weight, a monitoring camera (camera) 32 which is a TV camera or the like provided inside the housing 31 so as to incline to a pan direction and a tilt direction, a pan motor 33 (see FIG. 2) to incline the monitoring camera 32 to the pan direction, and a tilt motor 34 to incline the monitoring camera 32 to the tilt direction.

Note that, although the camera unit 30 is configured so as to face downward by its own weight, an optical axis does not accurately continuously face directly downward due to the resistance of the damper, the frictional resistance of the movable parts, or the like. Furthermore, in the embodiment, the pan motor 33, the tilt motor 34, a zoom function, or the like is not necessarily required.

The inclination (direction) of the monitoring camera 32 is adjusted by the operation of a pan switch (attitude operation means) SW1 (see FIG. 2) and a tilt switch SW2 (attitude operation means) of an operation unit (not illustrated) provided in the cabin 20. Furthermore, the monitoring camera 32 is zoomed by the operation of a zoom switch SW3.

[Work Region Line Display Device]

Figure 2:
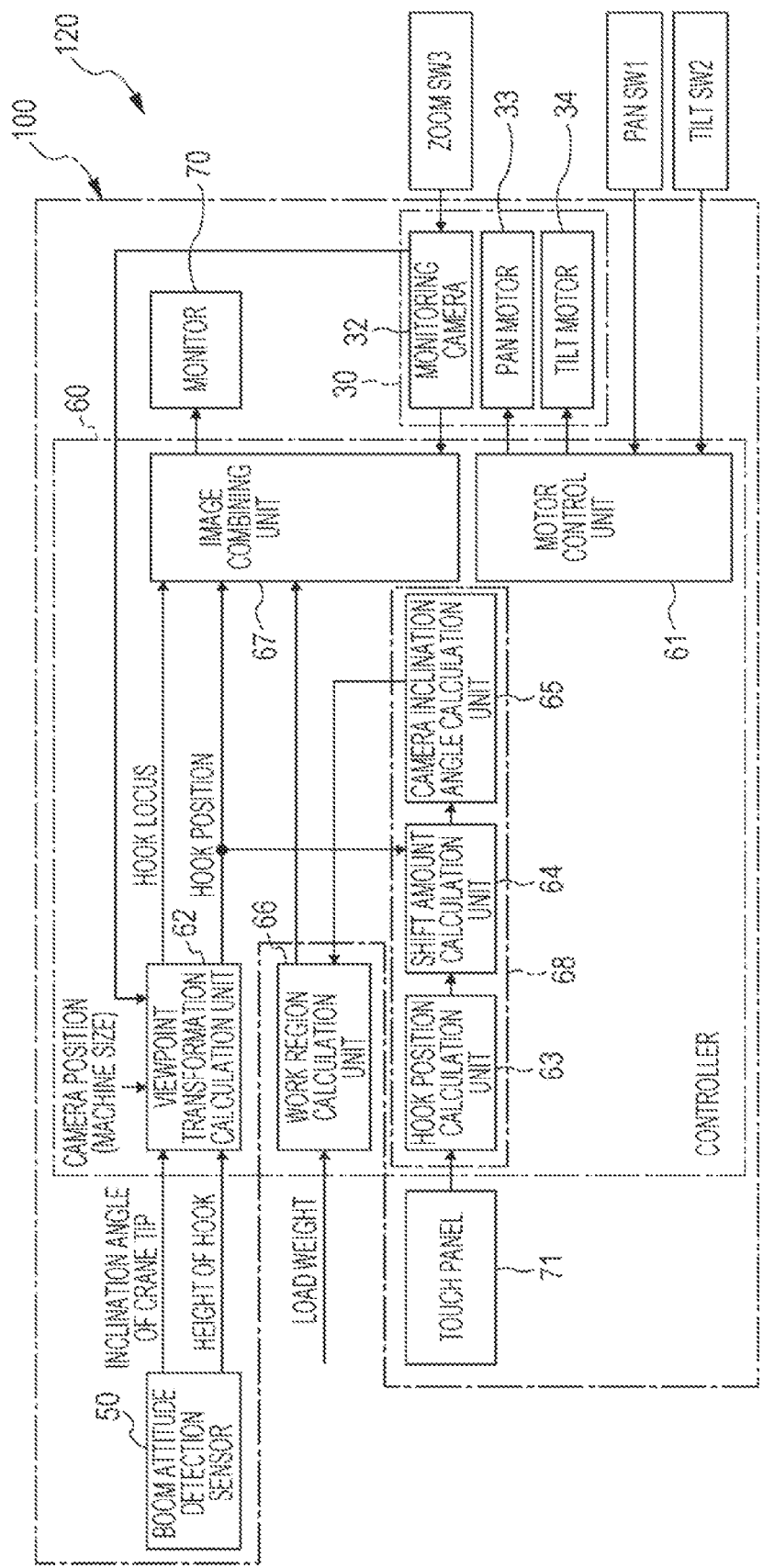
FIG. 2 is a block diagram illustrating a configuration of the work region line display device.

FIG. 2 is a block diagram illustrating a configuration of a work region line display device 120.

The work region line display device 120 includes a work region calculation unit 66 of a controller 60 and a camera attitude detection device 100.

[Camera Attitude Detection Device]

The camera attitude detection device 100 includes the camera unit 30 provided at a tip of the telescopic boom 16, a boom attitude detection sensor 50 to detect the attitude of the telescopic boom 16, the controller 60 (except the work region calculation unit 66) to calculate, based on a detection signal and the like detected by the boom attitude detection sensor 50, an attitude angle of the monitoring camera 32 and a work region line, a monitor 70 on which the image captured by the monitoring camera 32 is displayed, and a touch panel 71 attached to a screen (not illustrated) of the monitor 70.

The boom attitude detection sensor 50 detects an unwound amount of the hook 21, the length and derricking angle of the telescopic boom 16, the swivel angle of the telescopic boom 16, or the like, includes sensors (not illustrated) to detect them, and outputs hook position information in a real space.

[Controller]

As illustrated in FIG. 2, the controller 60 includes a motor control unit 61 to drive and control, based on the operation of the pan switch SW1 and the tilt switch SW2, the pan motor 33 and the tilt motor 34, a viewpoint transformation calculation unit (reference hook position calculation means) 62, the work region calculation unit 66, an image combining unit 67, and an attitude angle calculation device 68.

The attitude angle calculation device 68 includes a hook position calculation unit 63, a shift amount calculation unit 64, and a camera inclination angle calculation unit (camera attitude angle calculation means) 65.

[Viewpoint Transformation Calculation Unit]

First, the viewpoint transformation calculation unit 62 calculates, based on the inclination angle of the tip of the telescopic boom 16 and the unwound amount of the hook 21, the position of the hook 21 in an X, Y, Z coordinate system where the boom tip (the center of the sheave 23 illustrated in FIG. 6) is set as an origin.

Furthermore, the viewpoint transformation calculation unit 62 assumes that the monitoring camera 32 faces directly downward, transforms the position (position in the X,Y,Z coordinate system) of the hook 21 in the real space into the position in an x3,y3,z3 coordinate system (see FIG. 6) where the point, at which the optical center position of the monitoring camera 32 coincides with the center position of the captured image, is set as an origin, transforms the position of the hook 21 in the x3,y3,z3 coordinate system into the position in a coordinate system (screen coordinate system)

on the screen of the monitor 70, and calculates the position as a reference position (reference hook position) on the screen of the monitor 70.

In other words, when it is assumed that the monitoring camera 32 faces directly downward, the reference position, which is the position of the hook 21 displayed on the screen of the monitor 70, is calculated as the coordinate position on the screen.

Furthermore, the viewpoint transformation calculation unit 62 has a function of height detection means for calculating, based on the detection signal detected by the boom attitude detection sensor 50, the height (hook position information) in the height direction from the optical center position of the monitoring camera 32 to the hook 21.

[Hook Position Calculation Unit]

The touch panel 71 on the hook image displayed on the screen of the monitor 70 is touched, and thereby the hook position calculation unit 63 calculates the hook position in the screen coordinate system (on the screen of the monitor 70) on the image captured by the monitoring camera 32 facing in an arbitrary direction.

[Shift Amount Calculation Unit]

The shift amount calculation unit 64 calculates, based on the hook position calculated by the hook position calculation unit 63, a shift amount of the hook position with respect to the reference position calculated by the viewpoint transformation calculation unit 62, that is, the shift amount which is the difference between the reference position and the hook position (hook image position information).

[Camera Inclination Angle Calculation Unit]

The camera inclination angle calculation unit 65 calculates the inclination angle of the monitoring camera 32 (inclination to the perpendicular line) based on the shift amount calculated by the shift amount calculation unit 64 and a height h1, which is calculated by the viewpoint transformation calculation unit 62 and the height from an optical center position Q1 (see FIG. 5) of the monitoring camera 32 to the hook 21. In other words, the camera inclination angle calculation unit 65 calculates the attitude angle of the monitoring camera 32 based on the hook image position information and the hook position information in the real space.

[Work Region Calculation Unit]

The work region calculation unit 66 calculates, based on the load weight of a suspended load, the work region line indicating the region, the center of which is swivel center of the telescopic boom 16, where the suspended load is movable, and further calculates, based on the inclination angle of the monitoring camera 32, the precise position of the work region line on the image on the monitor 70.

The load weight of the suspended load is calculated by a calculation unit, which is not illustrated, of the controller 60 based on cylinder pressure detected by a pressure sensor (not illustrated) of the derricking cylinder 18, the derricking angle of the telescopic boom 16, and the length of the telescopic boom 16.

Here, the position of the work region line on the screen when the monitoring camera 32 inclines will be briefly described.

Figure 3:
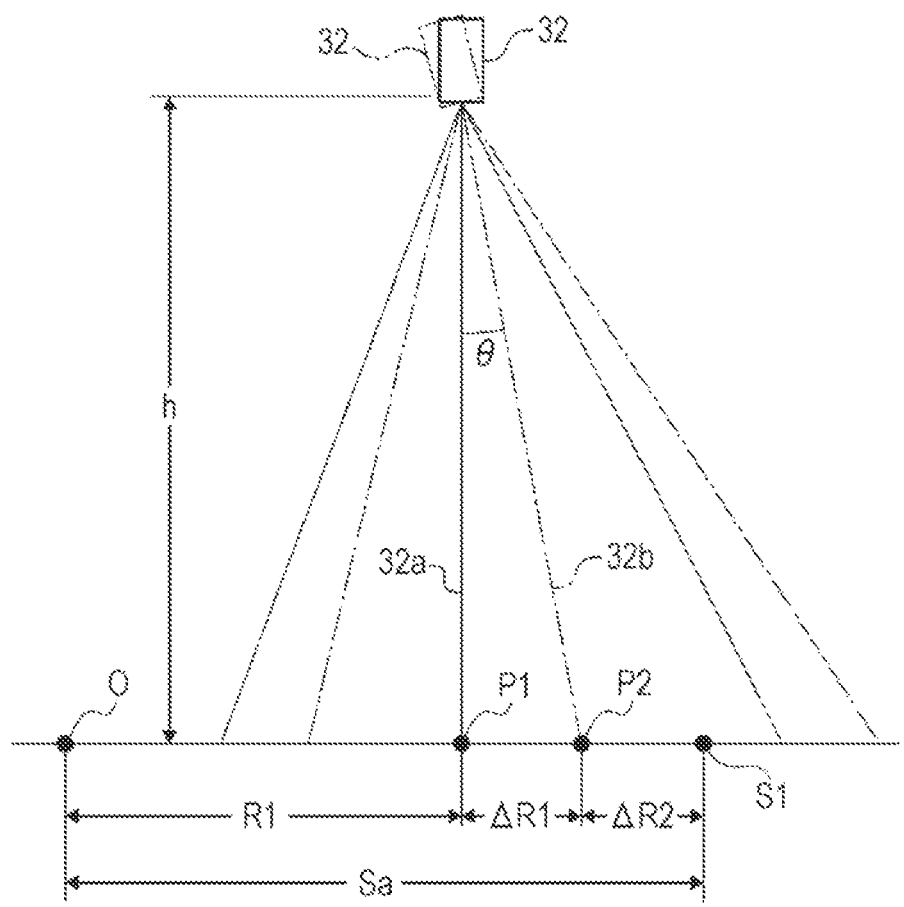
FIG. 3 is an explanatory diagram illustrating how to calculate a position of a work region line on a screen when a monitoring camera inclines.

As illustrated in FIG. 3, it is assumed that the height of the monitoring camera 32 from the ground is h, the ground position directly under the monitoring camera 32 is P1, the swivel center position of the telescopic boom 16 is O, and the work region line, the center of which is the swivel center position O, is S1. It is assumed that the distance from the swivel center position O to the work region line S1 is Sa. The height h can be calculated by the length and derricking angle of the boom 16.

When the monitoring camera 32 faces directly downward, it is assumed that the optical axis of the monitoring camera 32 at this time is 32a, and the position P1 which is the intersection point of the optical axis 32a and the ground is displayed at the center position on the screen of the monitor 70.

When the monitoring camera 32 inclines at angle θ, a position P2, which is the intersection point of an optical axis 32b of the monitoring camera 32 at this time and the ground, is displayed at the center position on the screen of the monitor 70. Note that, the turning center position and optical center position Q1 (see FIG. 5) of the monitoring camera 32 coincide.

It is assumed that the distance between the position P1 and the position P2 is ΔR1, ΔR1 can be calculated as h*tan θ as long as the angle θ is known, and the position P1 can be calculated from the position P2. Furthermore, it is assumed that a work radius of the telescopic boom 16 from the swivel center position O of the telescopic boom 16 is R1, the swivel center position O can be calculated from the position P1. Note that, the work radius R1 is calculated from the length and derricking angle of the telescopic boom 16.

Then, it is possible to calculate, based on the load weight, the position of the work region line S1 on the ground setting the swivel center position O as the center. The position P2 on the ground is the center position of the screen of the monitor 70, and the position P2 is positioned at the work radius R1+ΔR1 from the swivel center position O.

Furthermore, a distance ΔR2 from the position P2 to the work region line S1 is calculated as ΔR2=Sa−(R1+ΔR1).

Here, since the center position of the image on the monitor 70 when the monitoring camera 32 inclines at the angle θ indicates the position P2 on the ground and the height h is known, the coordinate position on the ground can be mapped to the coordinate position on the image. In other words, each position on the captured image can be mapped to the coordinate position in the crane coordinate system where the swivel center position O of the telescopic boom 16 is set as an origin.

Thus, it is possible to calculate the position of the image on the monitor 70 which corresponds to the position of the work region line S1 on the ground.

[Image Combining Unit]

The image combining unit 67 combines the work region line S1 on the position on the image corresponding to the position of the work region line S1 calculated by the work region calculation unit 66, and displays the combined image on the screen of the monitor 70.

[Operation]

Next, the operation of the camera attitude detection device 100 and the work region line display device 120 which are configured as described above will be described.

Figure 4:
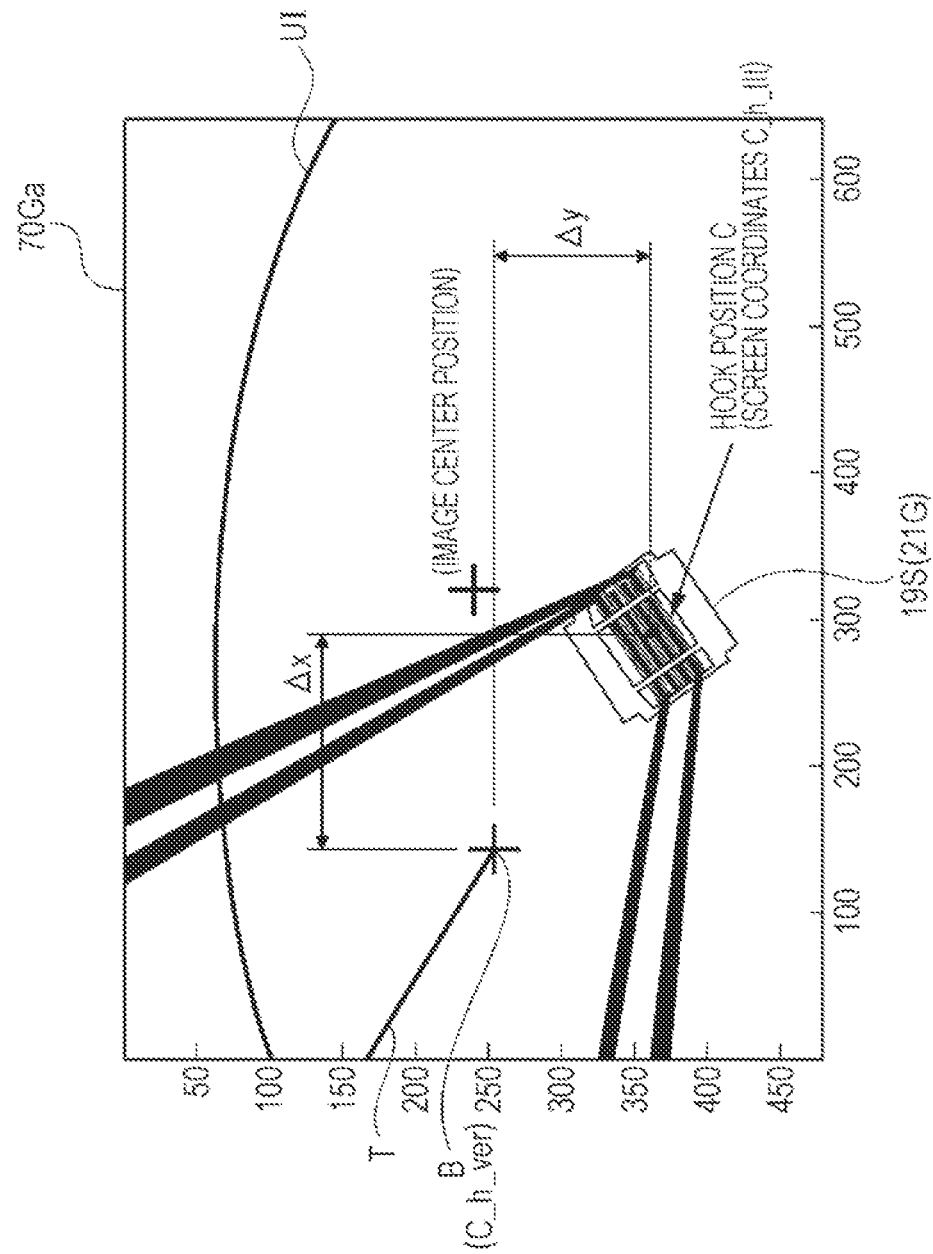
FIG. 4 is an explanatory diagram illustrating an example of an image displayed on a monitor.

It is assumed that the image of the hook block 19 is captured by the monitoring camera 32, and, for example, a hook block image 19S is displayed on a screen 70Ga of the monitor 70 as illustrated in FIG. 4. Note that, the description is based on the assumption that the position of the hook 21 is the position of a shaft 19J (see FIG. 1) of a sheave (not illustrated) provided on the hook block 19, and the hook image including the hook block image 19S is denoted as 21G for convenience of explanation. It is assumed that the monitoring camera 32 inclines in the tilt direction and the pan direction.

The operator touches the part of the touch panel 71 on the hook image 21G displayed on the screen 70Ga. The hook position calculation unit 63 calculates the coordinates Ch_tlt regarding a hook position C which is the touched position of the touch panel 71 as the position in an image coordinate system (the coordinate system where the upper end part of the left end of the screen is set as an origin). The coordinates C_htlt may be calculated by the image processing.

On the other hand, when it is assumed that the monitoring camera 32 faces directly downward, the viewpoint transformation calculation unit 62 calculates a position (reference position) B of the hook 21 on the screen of the monitor 70 when the image is captured by the monitoring camera 32 facing directly downward.

Here, it will be briefly described how to calculate the position B of the hook 21 on the screen when the monitoring camera 32 faces directly downward.

Figure 5:
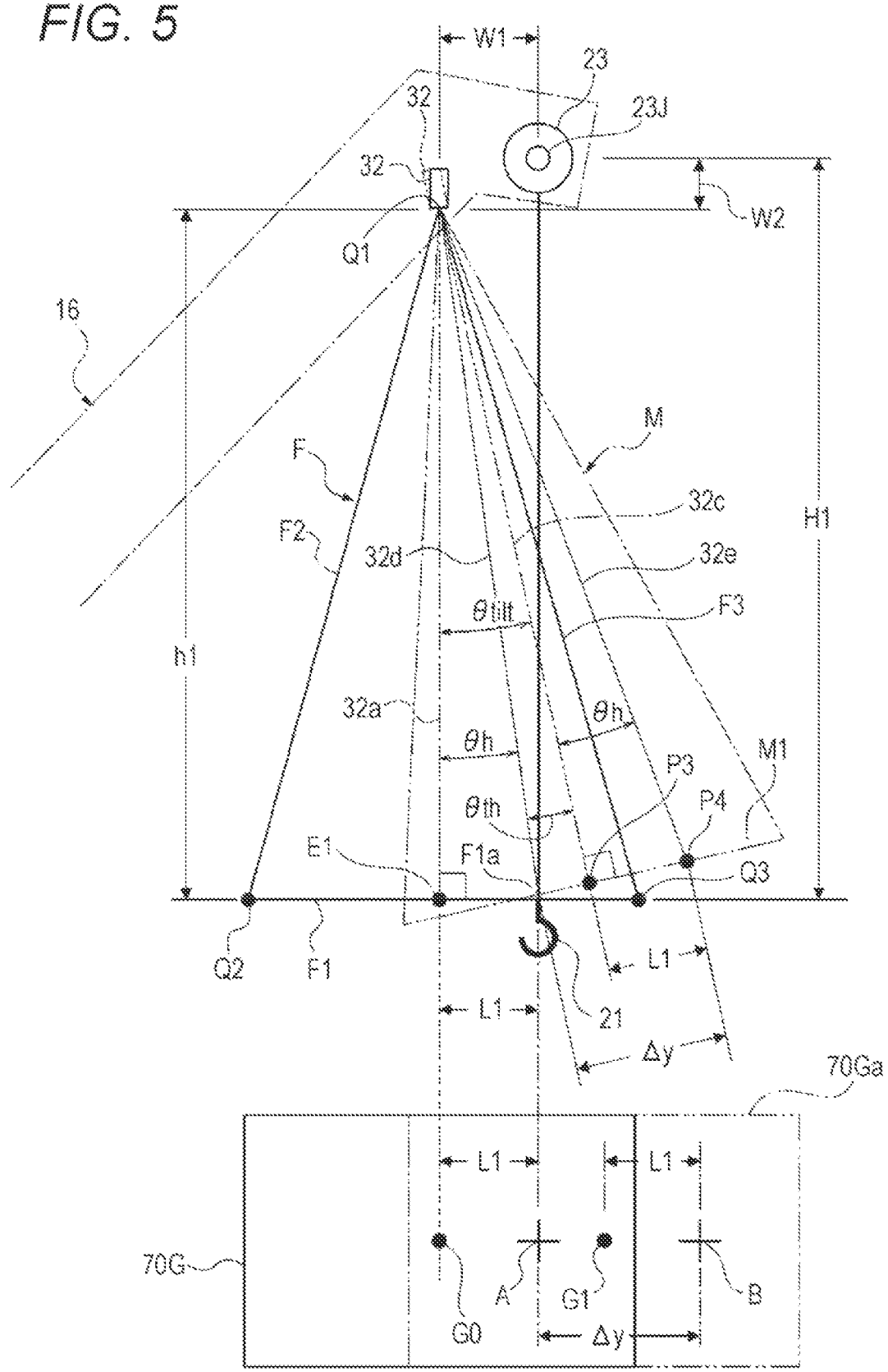
FIG. 5 is an explanatory diagram illustrating how to calculate an inclination angle of the monitoring camera from a position of a hook on the screen when the monitoring camera inclines.

When the distance from a shaft 23J (the center position of the sheave 23) of the sheave 23 at the tip of the telescopic boom 16 to the hook 21 is H1 and that the distance in the height direction from the optical center position Q1 of the monitoring camera 32 to the hook 21 is h1 as illustrated in FIG. 5, it is assumed that h1=H1−W2. The distance H1 can be calculated from the unwound amount of the hook 21, and an offset amount W2 in the perpendicular direction between the sheave 23 and the monitoring camera 32 can be calculated from the mounted position of the monitoring camera 32, the derricking angle of the telescopic boom 16, or the like.

Then, it is assumed that the intersection point of the optical axis 32a of the monitoring camera 32 and a base F1 of a triangle F formed by joining the optical center position Q1, points Q2, and Q3 is E1. Note that, the base F1 is the horizontal line indicating the height position of the hook 21, and the range between a line F2 joining the optical center position Q1 and the point Q2, and a line F3 joining the optical center positions Q1 and Q3, indicates the image capturing range of the monitoring camera 32. The image capturing range is the range when the monitoring camera 32 faces directly downward. Furthermore, it is assumed that a position F1a on the base F1 is the position of the hook 21.

The intersection point E1 is on the optical axis 32a and is a center position G0 of the screen 70G of the monitor 70. When the distance from the intersection point E1 to the hook 21 is L1, it is assumed that L1=W1, and W1 is the offset amount in the horizontal direction between the sheave 23 and the monitoring camera 32. The offset amount W1 can be calculated from the mounted position of the monitoring camera 32, the derricking angle of the telescopic boom 16, or the like.

Furthermore, the height h1 can be calculated from the unwound amount of the hook 21 and the offset amount W2 in the vertical direction between the sheave 23 and the monitoring camera 32.

Thus, the position A of the hook 21 on the screen 70G when it is assumed that the monitoring camera 32 faces directly downward can be calculated. Note that, 70G in FIG. 5 illustrates the screen of the monitor 70 when the monitoring camera 32 faces directly downward.

When the monitoring camera 32 inclines at an angle θtilt, the image captured by the monitoring camera 32 is the screen 70Ga of the monitor 70, and the hook 21 appears at the position A of the screen 70Ga as a real image. Note that, it is assumed that G1 is the center position of the screen 70Ga.

Since the position A separated by L1 from the center position G0 of the screen 70G (the intersection point E1 of the optical axis 32a) is the position of the hook 21, the position separated by L1 from the center position G1 of the screen 70Ga is the position of the hook 21 (reference hook position) B when it is assumed that the monitoring camera 32 faces directly downward. In other words, the position A of the screen 70G and the position B of the screen 70Ga are the same position of the screen.

The position B on the screen 70Ga is calculated by the viewpoint transformation calculation unit 62 using a perspective transformation matrix.

Figure 6:
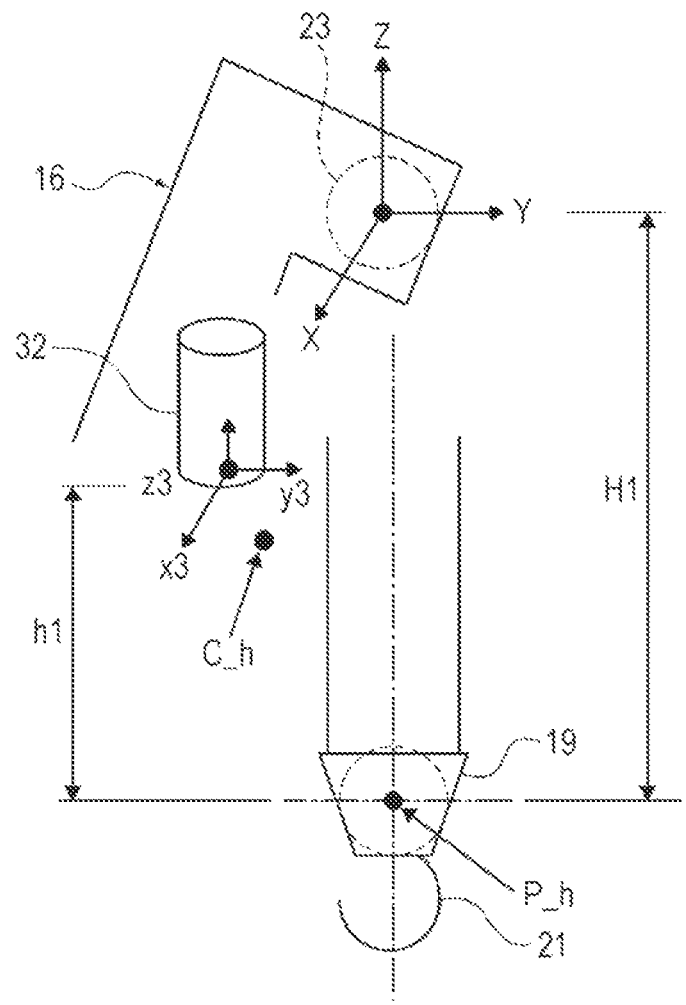
FIG. 6 is an explanatory diagram illustrating a coordinate system and a positional relation between a sheave at a boom tip, the monitoring camera, and the hook.

To briefly describe this, the viewpoint transformation calculation unit 62 calculates, based on the distances H1 and h1, and the offset amount W1, a position P_h of the hook block 19 in the X, Y, Z coordinate system, where the center of the sheave 23 is set as an origin, as illustrated in FIG. 6.

Furthermore, the viewpoint transformation calculation unit 62 makes the optical center position Q1 of the monitoring camera 32 coincident with the center of the captured image, calculates a position C_h of the hook block 19 as the position in a (x3, y3, z3) coordinate system where the center of the captured image is set as an origin, and calculates, based on the position C_h of the hook block 19 in the (x3, y3, z3) coordinate system, the position B of the screen 70Ga of the monitor 70 in the image coordinate system. It is assumed that the coordinates of the position B on the screen is Ch_ver (see FIG. 4).

Furthermore, when it is assumed that the monitoring camera 32 faces directly downward, the viewpoint transformation calculation unit 62 calculates a movement locus T of the hook block 19 on the screen 70Ga when the hook block 19 is raised or lowered. The image combining unit 67 combines the movement locus T and the position B on the image captured by the monitoring camera 32 and displays the combined image on the monitor 70.

As illustrated in FIG. 4, the shift amount calculation unit 64 calculates the difference between the coordinates C_h_tlt of the hook image, which is calculated by the hook position calculation unit 63, and the coordinates C_h_ver, which is calculated by the viewpoint transformation calculation unit 62, of the position B of the hook block 19 on the screen. In other words, the shift amount calculation unit 64 calculates the shift amounts Δx, Δy of the differences in the x direction and the y direction.

The camera inclination angle calculation unit 65 calculates the inclination angle of the monitoring camera 32 based on the following equations from the shift amount calculated by the shift amount calculation unit 64.

$$\text{tilt angle} = \tan^{-1}(\Delta y/h1) \quad (1)$$

$$\text{pan angle} = \tan^{-1}(\Delta x/h1) \quad (2)$$

Here, it will be described how to calculate the inclination angle of the monitoring camera 32 with reference to FIG. 5.

It is assumed that the monitoring camera 32 facing directly downward inclines at the angle θtilt in the tilt direction. It is assumed that the optical axis of the monitoring camera 32 inclining at the angle θtilt is 32c, and a triangle formed at the position where the triangle F inclines at the angle θtilt is M. It is assumed that the intersection point of a base M1 of the triangle M and the optical axis 32c is P3, and a straight line joining the optical center position Q1 and the position F1a is 32d. It is assumed that the angle between the straight line 32d and the optical axis 32a is θh, and the angle between the straight line 32d and the optical axis 32c is θth.

Then, it is assumed that the intersection point of a straight line 32e, the angle between which and the optical axis 32c is θh, and the base M1 is a position P4, and the position P4, which is the intersection point of the base M1 of the triangle M is the position F1a of the base F1 before the triangle F inclines. In other words, since the position F1a separated by the distance L1 from the intersection point E1 on the optical axis 32a of the monitoring camera 32 facing directly downward is the position of the hook 21, the position P4 separated by the distance L1 from the intersection point P3 on the optical axis 32C of the monitoring camera 32 inclining at the angle θtilt is the position of the hook 21 captured by the monitoring camera 32 facing directly downward.

Furthermore, the intersection point P3 on the optical axis 32c when the monitoring camera 32 inclines at the angle θtilt coincides with the center position G1 of the screen 70Ga of the monitor 70. Moreover, the position P4 separated by the distance L1 from the intersection point P3 is the position B of the screen 70Ga. It is assumed that a separated distance between the position F1a and the position P4 is Δy, the distance between the positions A and B on the screen 70Ga is Δy.

Then, since θtilt=θh+θth, it is assumed that:

$$\theta tilt = \tan^{-1}(L1/h1) + \tan^{-1}((\Delta y - L1)/h1) \quad (3)$$

From the positions A and B on the screen 70Ga, Δy can be calculated, L1 is known, and h1 can be calculated form the unwound amount of the hook 21, the derricking angle of the telescopic boom 16, or the like.

Therefore, by touching the position A of the screen 70Ga illustrated in FIG. 5 (the position C in FIG. 4), the hook position calculation unit 63 calculates the position A of the screen 70Ga, and thereby the shift amount calculation unit 64 calculates, from the difference between the position A and the position B calculated by the viewpoint transformation calculation unit 62, the distance Δy between the positions A and B. Then, the camera inclination angle calculation unit 65 calculates, from the distance Δy, the inclination angle θtilt of the monitoring camera 32 using the equation (3). Since the pan angle can be similarly calculated, the description thereof is omitted.

Although the inclination the angle θtilt can be accurately calculated with the equation (3), the tilt angle is calculated with the equation (1) and the pan angle is calculated with the equation (2) in order to simplify the calculation in the embodiment.

Here, when Δy=3 m, L1=0.5 m, and h1=10 m, the angle θtilt calculated with the equation (3) is 0.29494 rad, and the angle θtilt calculated with the equation (1) is 0.29146 rad. As described above, it is possible to calculate the sufficiently precise tilt angle with the equation (1). This is applicable to the pan angle.

As described above, by touching the part of the touch panel 71 on the hook image 21G on the screen 70Ga of the monitor 70 (see FIG. 4), the distances Δy and Δx are calculated, and the camera inclination angle calculation unit 65 calculates the inclination angle and the pan angle with the equations (1) and (2). Therefore, the inclination angle detection sensor to detect the inclination angle of the monitoring camera 32 is not required.

The work region calculation unit 66 calculates, based on the load weight of the suspended load, the work region line indicating the region where the suspended load is movable, and calculates, based on the inclination angle (the tilt angle and the pan angle) of the monitoring camera 32, which is calculated by the camera inclination angle calculation unit 65, the position of the work region line on the image on the monitor 70 corresponding to the work region line. As illustrated in in FIG. 4, the image combining unit 67 combines a work region line UI on the position on the image corresponding to the position of the work region line calculated by the work region calculation unit 66 and captured by the monitoring camera 32, and displays the combined image on the screen 70Ga of the monitor 70.

According to the first embodiment, the attitude angle detection sensor to detect the attitude of the monitoring camera 32 is not required, and it is possible to display, based on the inclination angle of the monitoring camera 32 calculated by the camera inclination angle calculation unit 65, the precise work region line UI on the monitor 70 and to provide the inexpensive camera attitude detection device 100 and work region line display device 120.

Figure 7:
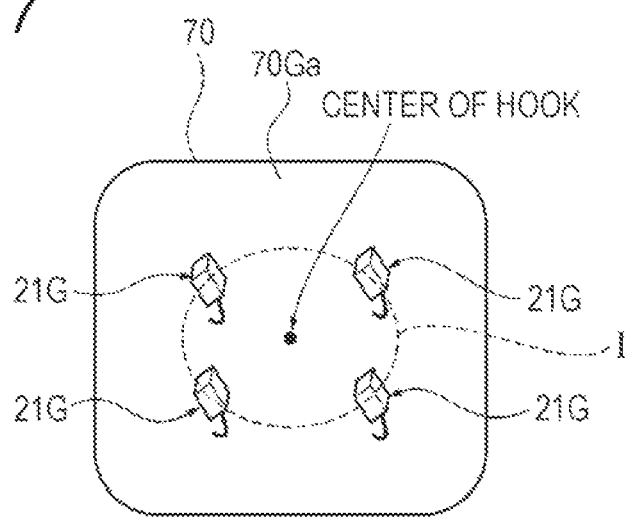
FIG. 7 is an explanatory diagram illustrating a state in which the hook swings.

Furthermore, when the hook 21 swings and the moving hook image 21G is displayed on the screen 70Ga of the monitor 70 as illustrated in FIG. 7, it is assumed that the center position of the figure formed by a movement locus I of the hook image 21G is the position of the hook image 21G, and the center position of the figure is touched. Alternatively, the center positions of a plurality of the hook images 21G may be calculated by the image processing.

Figure 8:
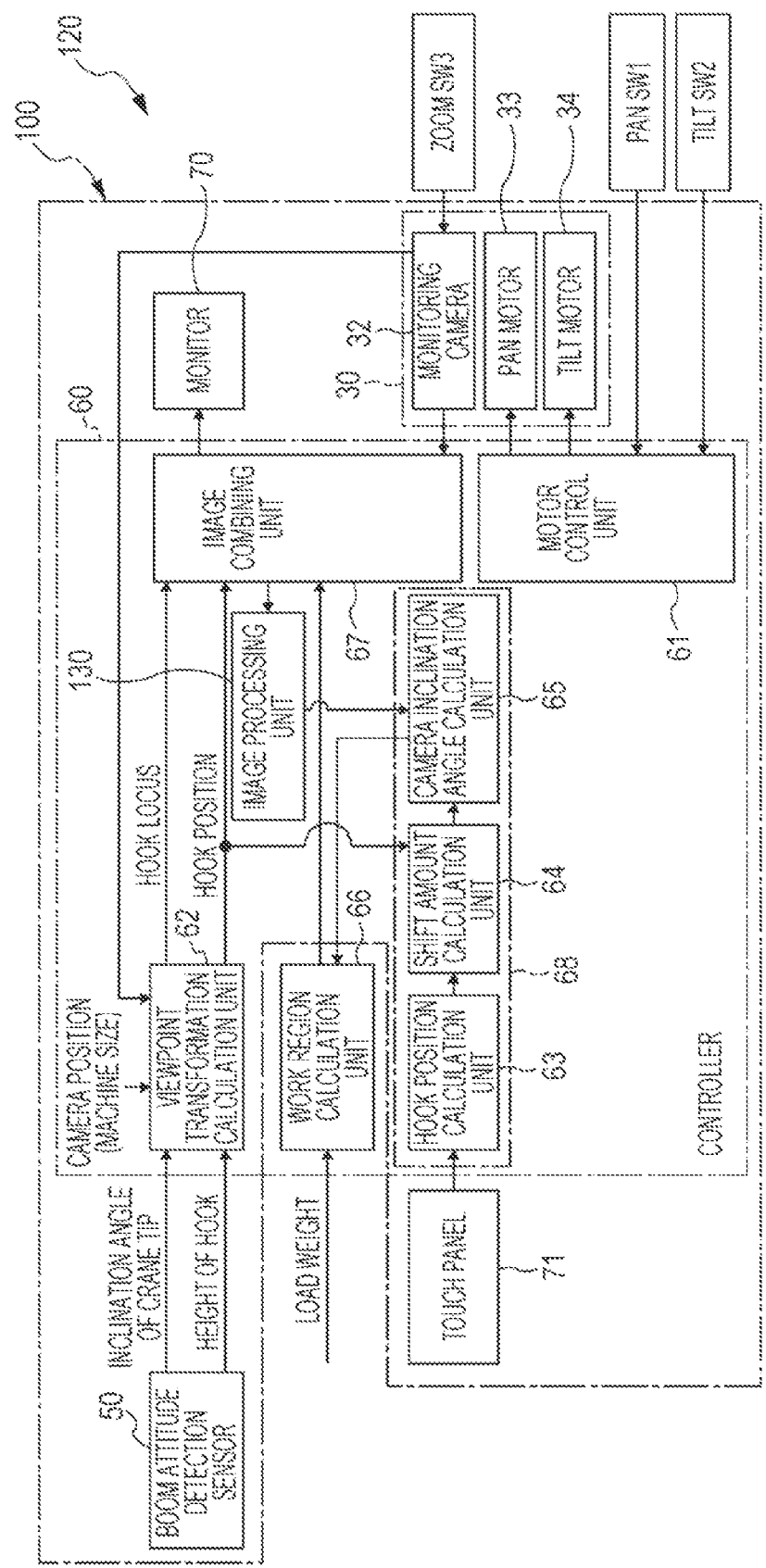
FIG. 8 is a block diagram illustrating a configuration of another example of a camera attitude detection device.

FIG. 8 illustrates another example of the camera attitude detection device 100 in which an image processing unit 130 calculates a height h1.

Figure 9:
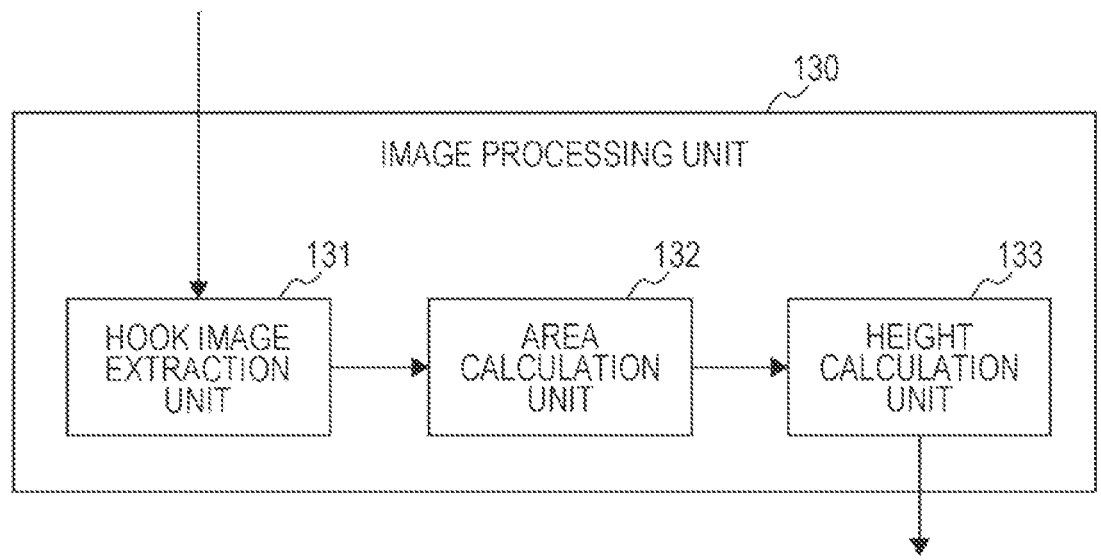
FIG. 9 is a block diagram illustrating a configuration of an image processing unit illustrated in FIG. 8.

As illustrated in FIG. 9, the image processing unit 130 includes a hook image extraction unit 131 to extract a hook image from the image captured by the monitoring camera 32, an area calculation unit 132 to calculate the area of the hook image extracted by the hook image extraction unit 131, and a height calculation unit 133 to calculate the height h1 from the area (size) calculated by the area calculation unit 132.

Since the area of the hook image becomes smaller as the height h1 increases, the height h1 is calculated by using this relation.

When the camera is zoomed, the zoom magnification is calculated from the size of the hook image and the length of the wire image displayed on the monitor 70, and the height h1 is calculated from the zoom magnification and the area of the hook image. The ratio of the hook area, in which the length of the wire 25 displayed on the monitor 70 is set as a parameter, has been stored in a memory, which is not illustrated, and the length of the displayed wire 25 is calculated, whereby the zoom magnification is calculated from the zoom magnification corresponding to the length.

Figure 10:
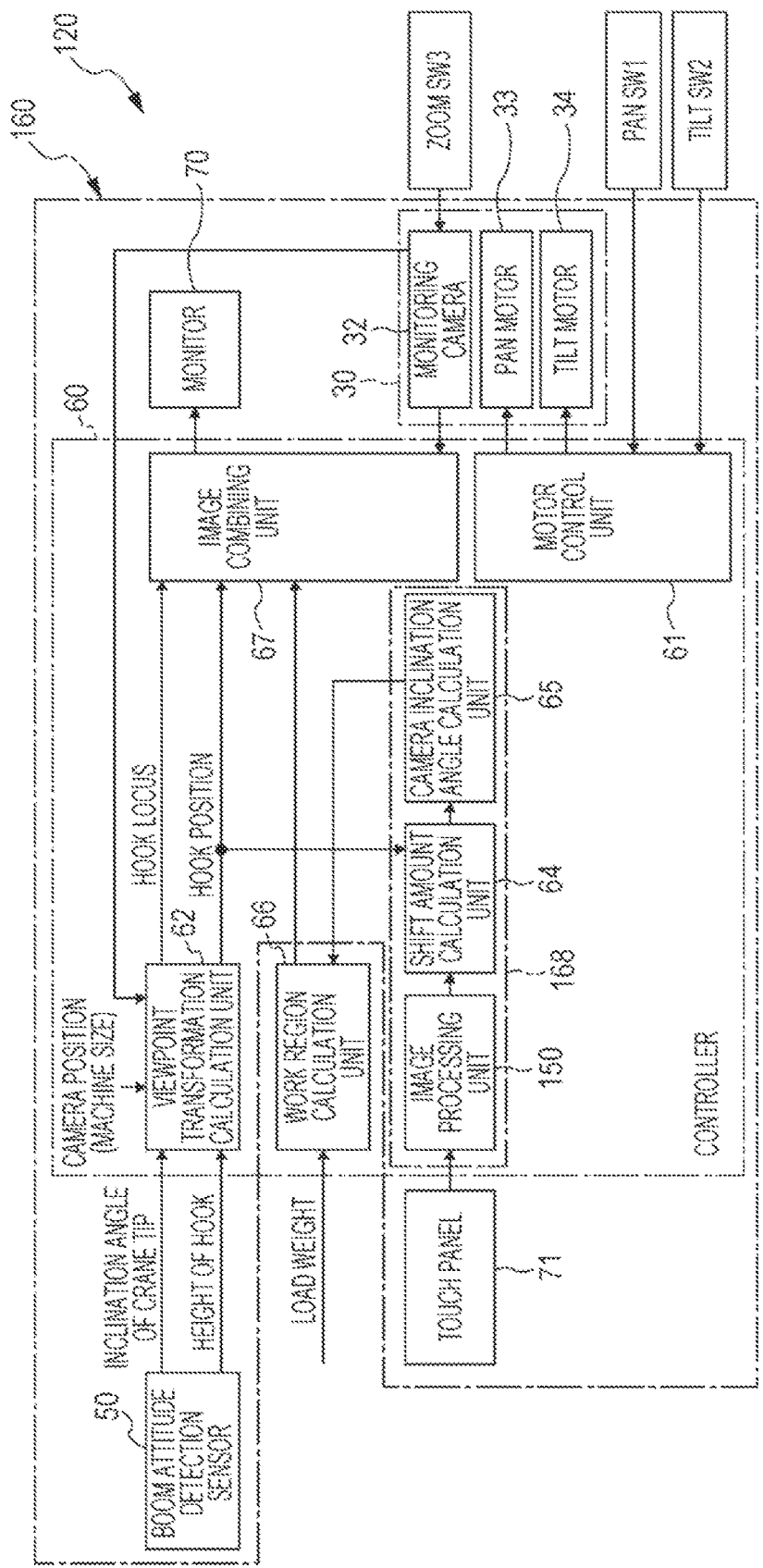
FIG. 10 is a block diagram illustrating a configuration of another example of a camera attitude detection device.

FIG. 10 illustrates another example of a camera attitude detection device 160 in which an image processing unit 150 calculates the hook position.

Figure 11:
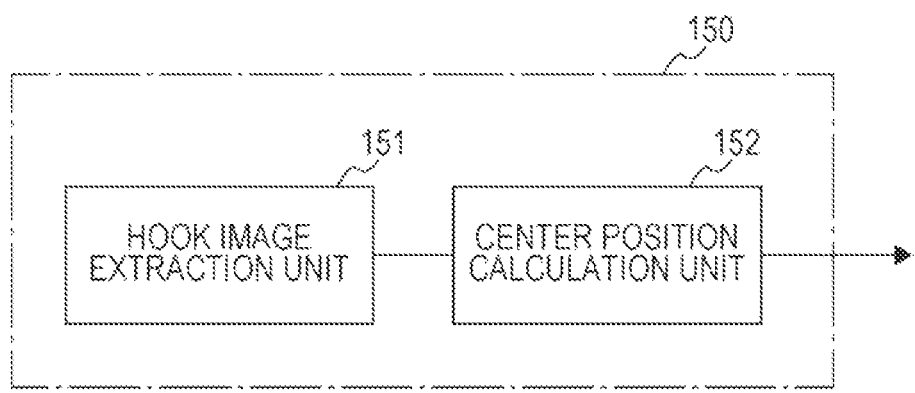
FIG. 11 is a block diagram illustrating a configuration of an image processing unit of the camera attitude detection device illustrated in FIG. 10.

As illustrated in FIG. 11, the image processing unit 150 includes a hook image extraction unit 151 to extract the hook image from the image captured by the monitoring camera 32 and a center position calculation unit 152 to calculate the center position of the hook image extracted by the hook image extraction unit 151 as the hook position. The other configuration is similar to the camera attitude detection device 100 illustrated in FIG. 2, and the description thereof is omitted.

The hook image extraction unit 151 calculates the image by image processing, such as a region growing method, or a pattern matching.

In the region growing method, the lines having a different brightness difference are calculated as boundaries of the hook from the hook position where the screen of the monitor 70 is touched, and the figure center of the figure enclosed by the boundaries is set as the hook position.

In the pattern matching, a hook pattern for each zoom magnification is stored in advance, and the position where the pattern coincides with an actual hook image obtained by performing scan processing to the screen is calculated, whereby the position is set as the hook position.

Figure 12:
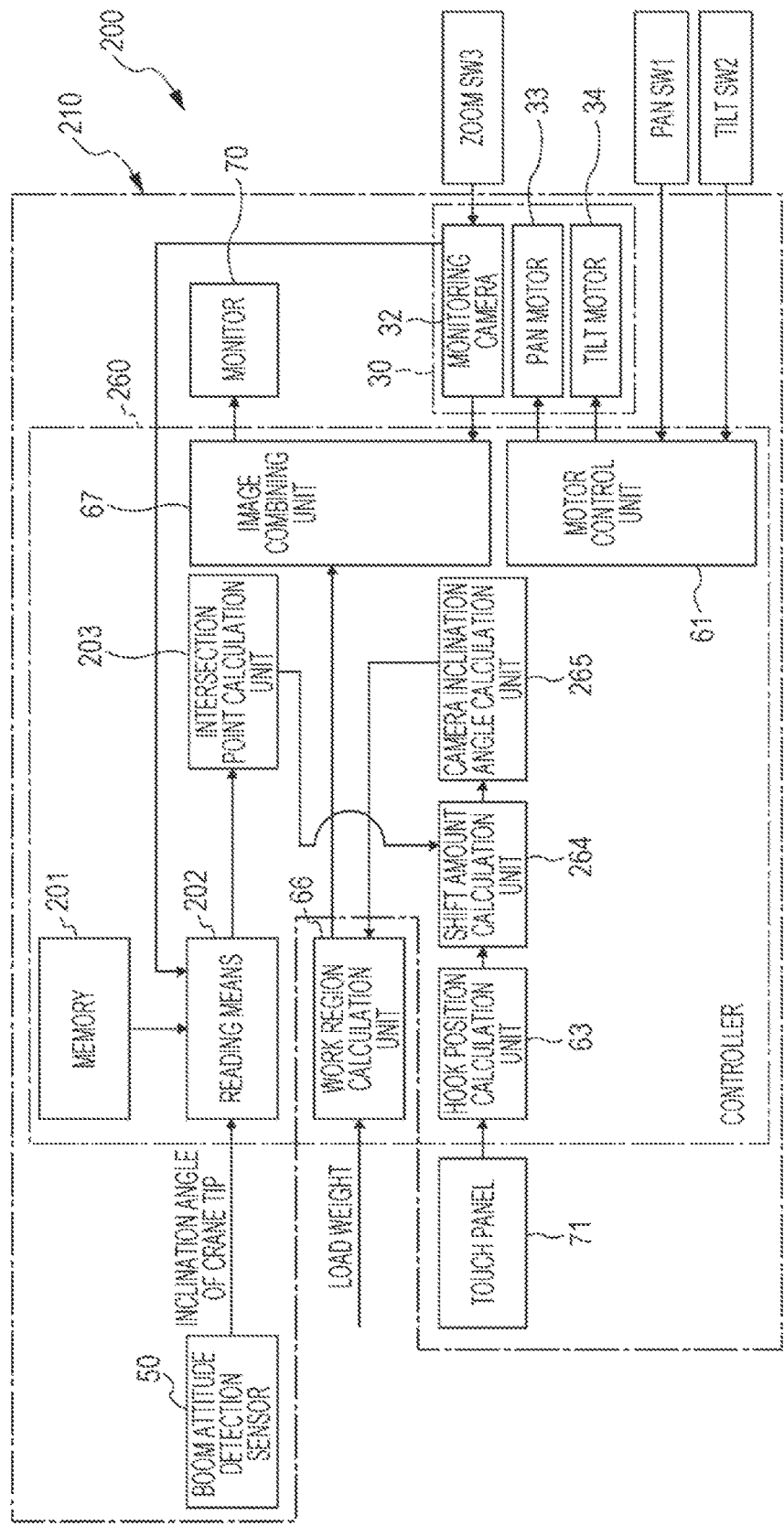
FIG. 12 is an explanatory diagram illustrating a configuration of a camera attitude detection device of a second embodiment.

When the hook image is extracted with an image processing method, such as the pattern matching, the touch panel 71 is not necessarily required Second Embodiment FIG. 12 is a block diagram illustrating a configuration of a work region line display device 200 of a second embodiment.

The work region line display device 200 includes a work region calculation unit 66 of a controller 260 and a camera attitude detection device 210.

[Camera Attitude Detection Device]

The camera attitude detection device 210 includes a camera unit 30, a boom attitude detection sensor 50, the controller 260 (except the work region calculation unit 66), a monitor 70, and a touch panel 71.

[Controller]

The controller 260 includes a memory 201 in which a movement locus of a hook 21 is stored in association with a derricking angle of a telescopic boom 16 and a zoom magnification of a monitoring camera 32, a reading means 202 to read the movement locus stored in the memory 201 based on the derricking angle of the telescopic boom 16 and the zoom magnification of the monitoring camera 32, an intersection point calculation unit 203 to calculate an intersection point V1 of a read movement locus K1 (see FIG. 13) and a radial direction line N1, a hook position calculation unit 63, a shift amount calculation unit 264, a camera inclination angle calculation unit 265, a motor control unit 61, and an image combining unit 67.

[Memory]

When the monitoring camera 32 faces directly downward, the movement locus of the hook 21 displayed on the screen of the monitor 70 when the hook 21 is raised or lowered is stored in the memory 201 in association with the derricking angle of the telescopic boom 16 and the zoom magnification of the monitoring camera 32.

[Intersection Point Calculation Unit]

Figure 13:
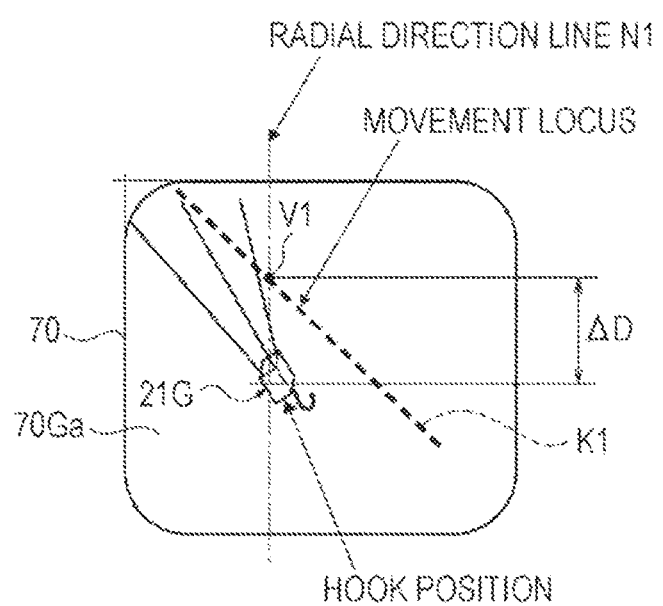
FIG. 13 is an explanatory diagram illustrating a hook image displayed on the monitor, a radial direction line passing through the hook image, and a movement locus of the hook.

The intersection point calculation unit 203 calculates the intersection point V1 of the movement locus K1 and the radial direction line N1 passing through the hook image 21G as illustrated in FIG. 13. The radial direction line N1 is parallel to a line projected on the horizontal plane passing through the center position of the hook 21 in the extending direction of the telescopic boom 16 and is the line passing through the center position of the hook 21. In other words, when the extending direction of the telescopic boom 16 is the perpendicular direction of a screen 70Ga of the monitor 70, a line extending in the perpendicular direction passing through the hook image 21G is the radial direction line N1.

[Shift Amount Calculation Unit]

The shift amount calculation unit 264 calculates a separated distance ΔD between the position of the hook image 21G and the intersection point V1.

[Camera Inclination Angle Calculation Unit]

The camera inclination angle calculation unit 265 calculates the inclination angle θ of the monitoring camera 32 (the inclination angle in the radial direction) from the separated distance ΔD and the distance h1 (see FIG. 5) in the height direction from an optical center of the monitoring camera 32 to the hook position based on the following equation (4).

$$\theta = \tan^{-1}(\Delta D/h1) \quad (4)$$

This is the same equation as the equation (1), as illustrated in FIG. 5, a position B of the screen 70Ga is the position (the intersection point V1) on the movement locus K1 illustrated in FIG. 13, and a position A of the screen 70Ga is the position of the hook image 21G. Furthermore, the direction joining the position A and the position B is the extending direction of the telescopic boom 16, and the distance Δy between the positions A and B is ΔD illustrated in FIG. 13. Therefore, the inclination angle θ of the monitoring camera 32 can be calculated with the equation (4).

The embodiment is an effective method for the monitoring camera 32 which downwardly follows the derricking motion of the telescopic boom 16 only in the tilt direction.

The other configuration is similar to the first embodiment, and the description thereof is omitted.

Third Embodiment

In a third embodiment, an image captured by a monitoring camera 32 provided at a tip of a telescopic boom 16 is displayed on a monitor 370 (see FIG. 16), the direction of the monitoring camera 32 is operated by pan and tilt operation, and a hook 21 is positioned at a predetermined position on a screen 370G of the monitor 370, whereby an attitude angle of the monitoring camera 32 is detected.

Figure 14:
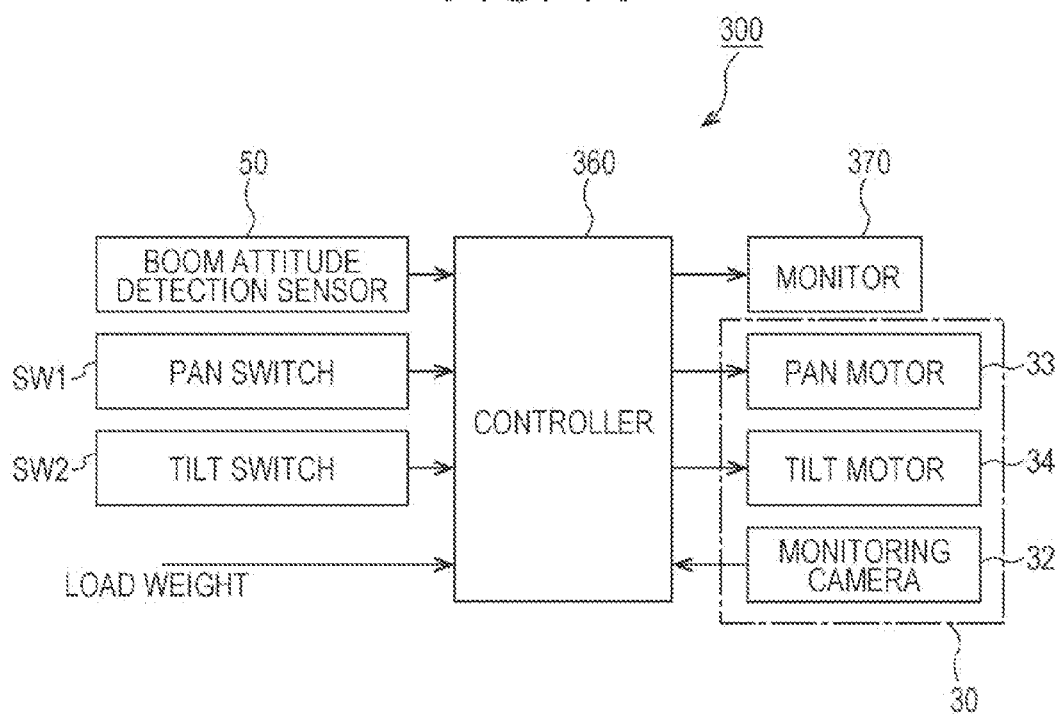
FIG. 14 is a block diagram illustrating a configuration of a work region line display device of a third embodiment.
Figure 15:
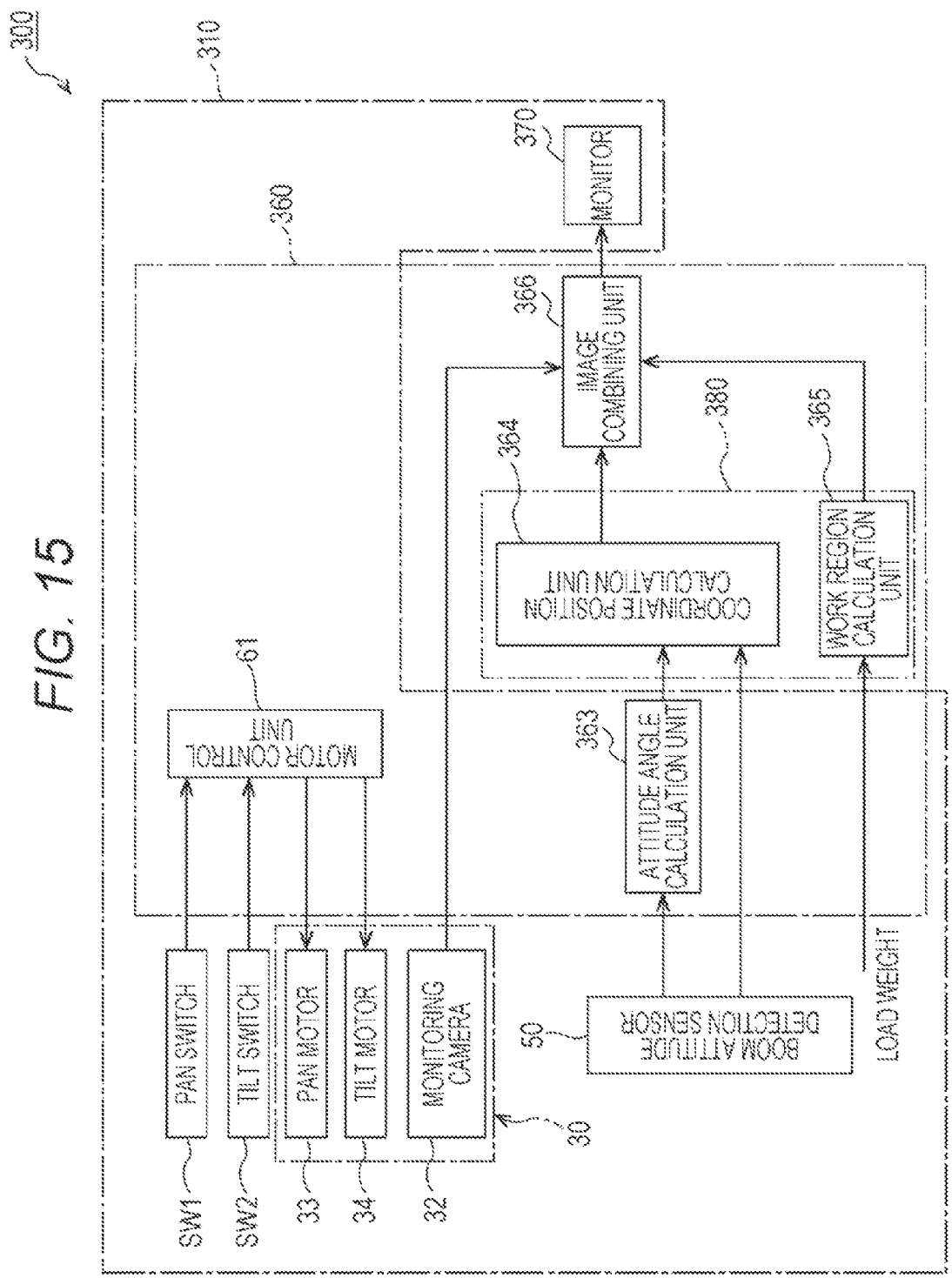
FIG. 15 is a block diagram of the work region line display device in which a configuration of a control illustrated in FIG. 14 is detailedly illustrated.

FIGS. 14 and 15 are block diagrams illustrating a configuration of a work region line display device 300 of the third embodiment. FIG. 15 detailedly illustrates the configuration inside a controller 360 illustrated in FIG. 14, and illustrates the work region line display device 300 classified into four components of a camera attitude detection device 310, a coordinate position calculation unit 364, a work region calculation unit 365, and an image combining unit 366.

The camera attitude detection device 310 includes a camera unit 30, a boom attitude detection sensor 50, the controller 360, the monitor 370 to display the image captured by the monitoring camera 32, a pan switch SW1, and a tilt switch SW2.

Figure 16:
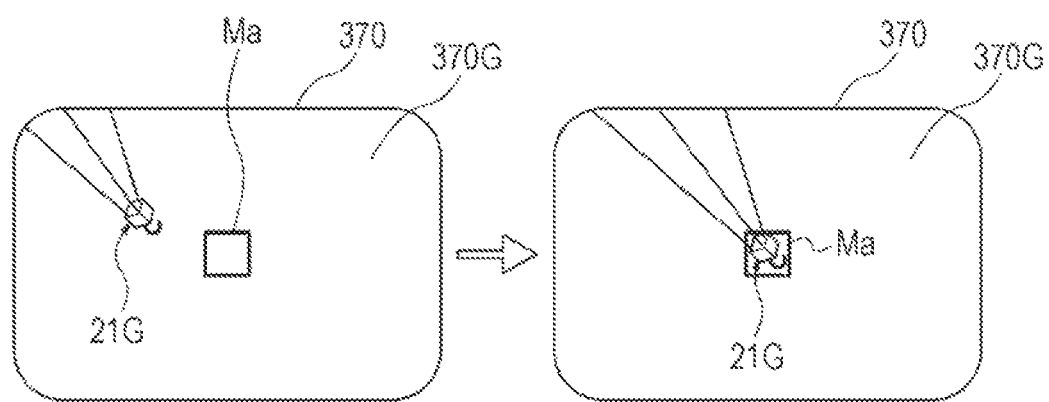
FIG. 16 is an explanatory diagram illustrating states before and after the hook image is fitted in a frame displayed in the center of the monitor.

On the screen 370G of the monitor 370, as illustrated in FIG. 16, a rectangular frame Ma is displayed in the center part of the screen.

[Controller]

As illustrated in FIG. 15, the controller 360 includes a motor control unit 61, an attitude angle calculation unit (calculation means) 363, a coordinate position calculation unit (coordinate position calculation means) 364, a work region calculation unit (work region calculation means) 365, and an image combining unit 366.

The motor control unit 61 controls a pan motor 33 and a tilt motor 34 based on the signal from the pan switch SW1 and the tilt switch SW2.

The attitude angle calculation unit 363 calculates the attitude angle of the monitoring camera 32 based on an unwound amount of a winch output from the boom attitude detection sensor 50, the length of the telescopic boom 16 and an offset amount W1 which will be described later.

The coordinate position calculation unit 364 calculates, based on the attitude angle calculated by the attitude angle calculation unit 363 and the various detection signals of the telescopic boom 16 output from the boom attitude detection sensor 50, a coordinate position at each position on the captured image in a crane coordinate system where a swivel center position of the telescopic boom 16 is set as an origin.

The work region calculation unit 365 calculates, based on a load weight of a suspended load, a work region line indicating the region where the suspended load is movable.

The image combining unit 366 combines the work region line calculated by the work region calculation unit 365 on the image captured by the monitoring camera 32 mapped on the coordinate position calculated by the coordinate position calculation unit 364, and displays the combined image on the monitor 370.

Then, the coordinate position calculation unit 364 and the work region calculation unit 365 constitute the work region calculation device 380 to calculate the precise position of the work region line on the image.

[Theory]

Figure 17:
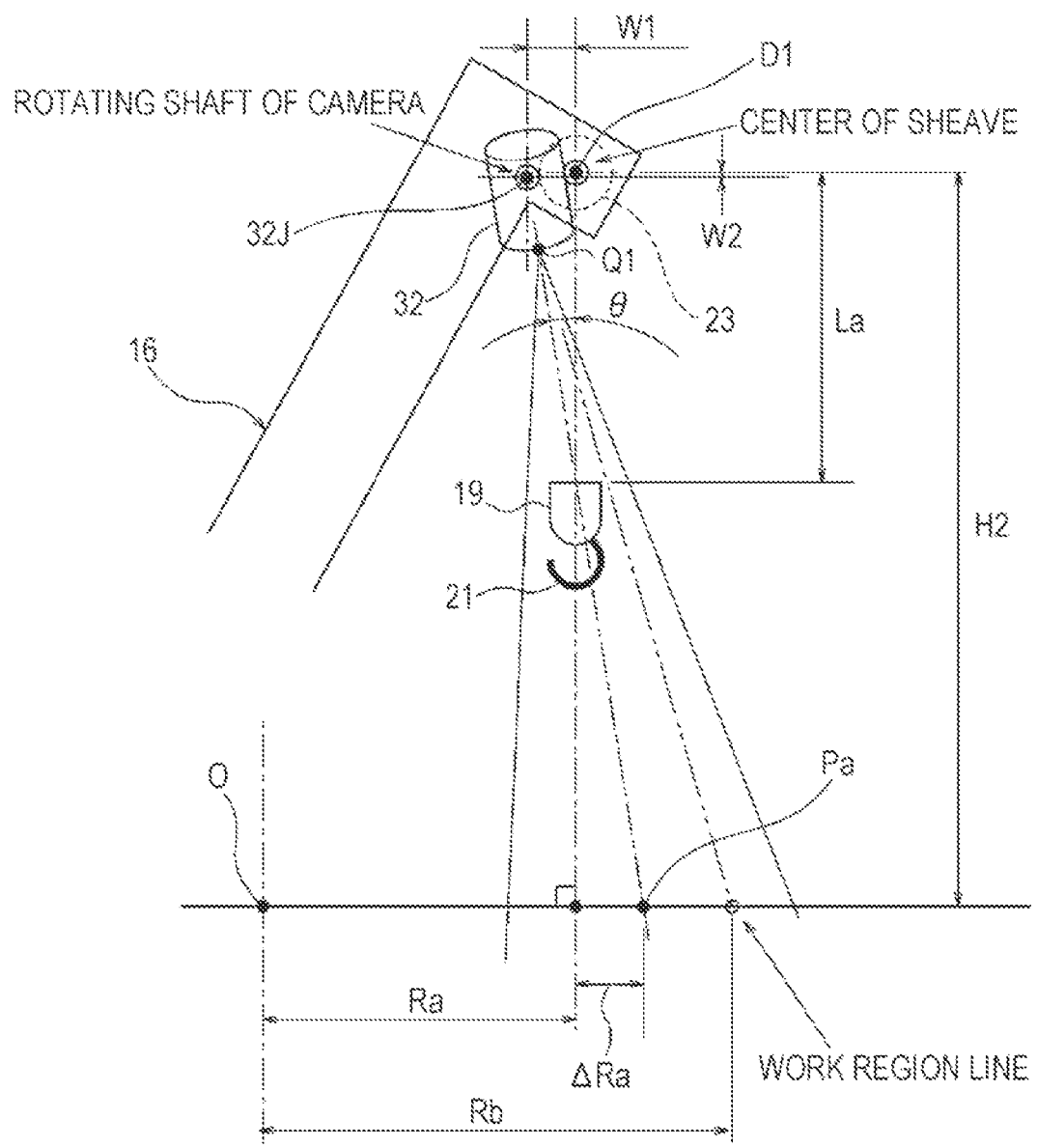
FIG. 17 is an explanatory diagram illustrating theory to geometrically calculate the work region line.

As illustrated in FIG. 17, it is assumed that a rotating shaft 32J of the monitoring camera 32 and a center D1 of a sheave 23 have an offset amount of W1 in the left and right directions (in the case in which an offset amount W2 in the perpendicular direction can be ignored). Furthermore, it is assumed that the height from the ground to the center D1 of the sheave is H2, that the length from the center D1 of the sheave to the hook block 19 is La, and that the inclination of the monitoring camera 32 when an optical axis of the monitoring camera 32 is turned to the hook 21, that is, the inclination angle of the monitoring camera 32 with respect to the perpendicular line when the optical axis of the monitoring camera 32 is turned to the hook 21 is $\theta$. Then, it is assumed that a work radius of the telescopic boom 16 from a swivel center position O of the telescopic boom 16 is Ra, that the distance between the work radius Ra and a position Pa on the ground which is the image center when the monitoring camera 32 is titled is $\Delta$Ra, and that the length joining the rotating shaft 32J of the monitoring camera 32 and an optical center position Q1 is negligibly small with respect to the height H2, then the distance $\Delta$Ra can be calculated with the following equation.

$$\Delta Ra = H2 \tan \theta - W1$$

The inclination $\theta$ of the monitoring camera 32 can be calculated from the length La and the offset amount W1. The length La is calculated from an unwound amount of a wire 25. The inclination of the monitoring camera 32 in the pan direction is similarly calculated.

The height H2 can be calculated from the length and derricking angle of the telescopic boom 16. Note that, since the camera rotating shaft 32J and the position of the center D1 of the sheave with respect to the telescopic boom 16 are known, the offset amount W1 can be calculated according to the derricking angle of the telescopic boom 16.

The position on the ground corresponding to the center position of the image on the monitor 370 is Pa, and the swivel center position O of the telescopic boom 16 can be calculated from the position Pa with an error $\Delta$Ra and the work radius Ra. Similarly, the swivel center position O in the pan direction is calculated.

Then, the work region line can be drawn at the position of a distance Rb (the distance indicating the work region range) setting the swivel center position O as the center.

Here, since the center position of the image indicates the position Pa on the ground and the height H2 is known, the coordinate position on the ground can be mapped on the coordinate position on the image. In other words, the coordinate position in the crane coordinate system where the swivel center position of the telescopic boom 16 is set as an origin is mapped on each position on the captured image.

Thus, it is possible to superimpose the work region line on the precise position of the image and display the superimposed image on the monitor 70.

Figure 17A:
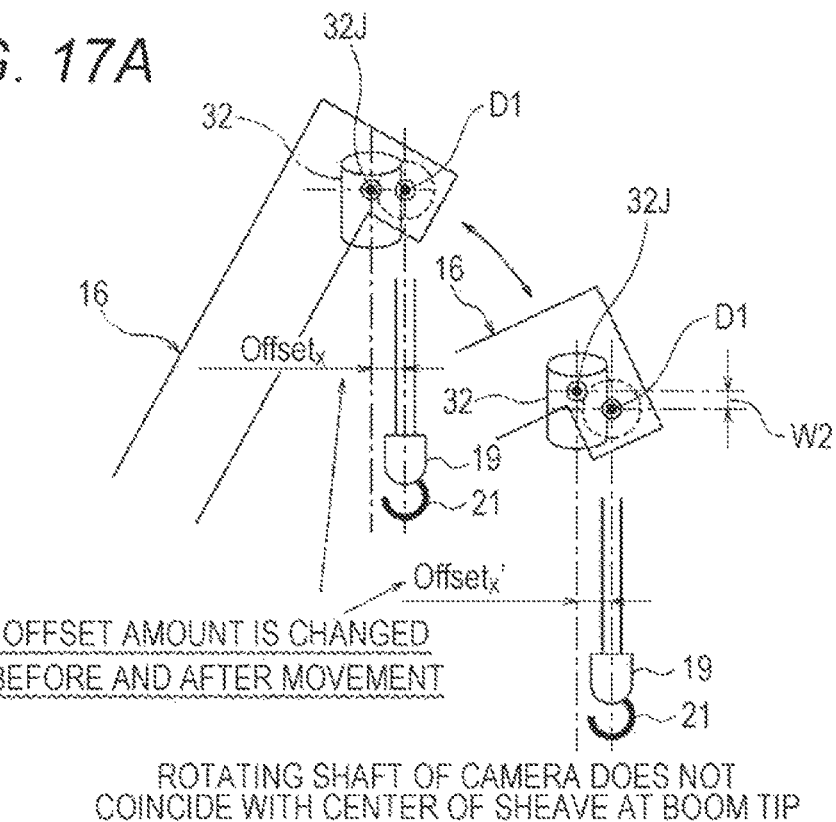
FIG. 17A is an explanatory diagram illustrating that an offset is changed according to a derricking angle of a telescopic boom.

Note that, as illustrated in FIG. 17A, although the offset amount W2 is also generated in the perpendicular direction due to the derricking angle of the telescopic boom 16, the offset amount W2 can be also calculated from the derricking angle, the inclination of the monitoring camera 32 can be geometrically calculated.

That is, the following equation is established:

$$\Delta Ra = H1' \tan \theta - W1, \; H1' = H2 - W2$$

where H1' is the height from the ground to the camera rotating shaft 32J.

With the equation, the inclination $\theta$ of the monitoring camera 32 can be calculated from the length L1 and the offset amounts W1 and W2. The inclination of the monitoring camera 32 in the pan direction is similarly calculated.

Figure 17B:
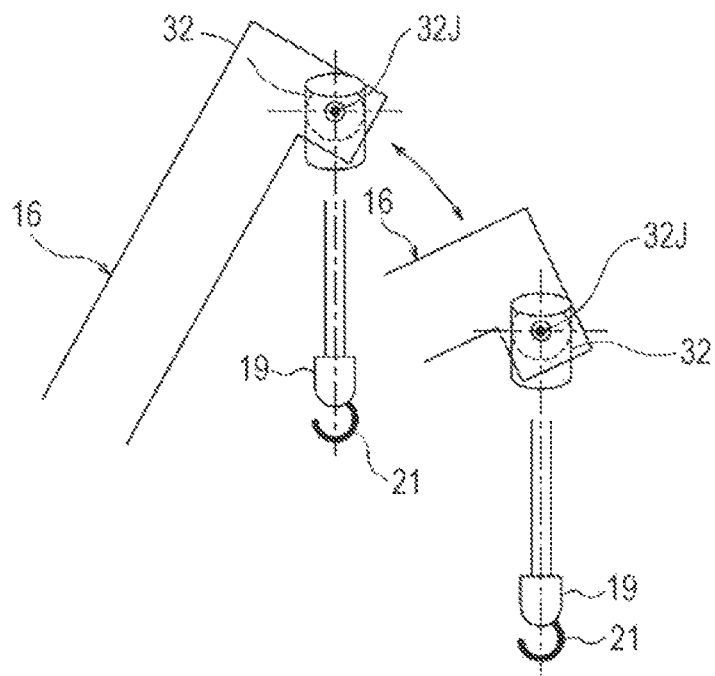
FIG. 17B is an explanatory diagram illustrating that an inclination angle of the monitoring camera is fixed regardless of the derricking angle of the telescopic boom when a rotating shaft of the monitoring camera coincides with a center of the sheave.

Furthermore, as illustrated in FIG. 17B, when the turning shaft of the monitoring camera 32 is provided at the same shaft as the turning shaft of the sheave, the offset amounts W1 and W2 are not generated, and it is not necessary to consider the offset amount.

[Operation]

Next, the operation of the work region line display device 300 which is configured as described above will be described.

As illustrated in FIG. 16, the operator operates the pan switch SW1 and the tilt switch SW2 and inclines the monitoring camera 32 so that the hook image 21G is continuously fitted in the center frame Ma on the screen 370G of the monitor 370.

When the controller 360 calculates the actual load weight of the suspended load or the operator inputs the load weight, the work region calculation unit 365 (see FIG. 15) calculates the work region line based on the actual load weight or input load weight.

On the other hand, the attitude angle calculation unit 363 calculates a suspended length La of the hook 21 illustrated in FIG. 17 from the detection signal output from the boom attitude detection sensor 50, that is, from the wound-out amount of the wire 25 (see FIG. 1) unwound by the winch and the length of the telescopic boom 16, and calculates, from the length La and the offset amount W1, the inclination angle $\theta$ (the angle in the pan or tilt direction) of the monitoring camera 32 with respect to the perpendicular line.

In other words, the attitude angle calculation unit 363 calculates the inclination angle $\theta$ of the monitoring camera 32 from tip position information on the telescopic boom 16 (the position calculated from the length and derricking angle of the telescopic boom 16) and position information on the hook 21 (the offset amount W1 and the length La).

The coordinate position calculation unit 364 calculated the height H2 illustrated in FIG. 17 based on the detection signal output from the boom attitude detection sensor 50, that is, the length and derricking angle of the telescopic boom 16, and further calculates, from the height H2 and the inclination angle $\theta$ of the monitoring camera 32, the coordinate position corresponding to each position on the captured image in the crane coordinate system where the swivel center position of the telescopic boom 16 is set as an origin.

Figure 18:
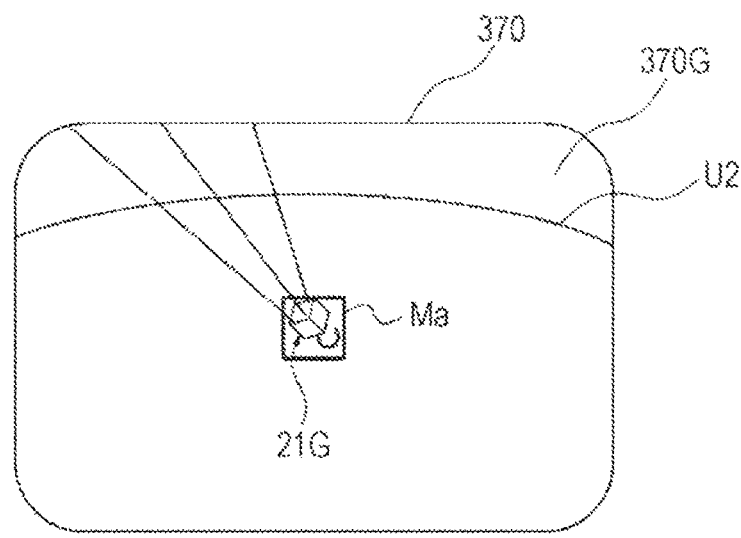
FIG. 18 is an explanatory diagram illustrating the monitor screen on which the frame, the hook image, and the work region line are displayed.

As illustrated in FIG. 18, the image combining unit 366 combines (superimposes) a work region line U2 calculated by the work region calculation unit 365 on the image corresponding to the coordinate position in crane coordinate system calculated by the coordinate position calculation unit 364, and displays the combined image on the monitor 370.

In the third embodiment, an attitude angle detection sensor to detect the attitude of the monitoring camera 32 is not required, and it is possible to obtain an effect similar to the first embodiment.

In the third embodiment, although the hook image 21G deviates from the frame Ma on the screen 370G of the monitor 370 due to the derricking motion of the telescopic boom 16, or raising or lowering the suspended load according to a work, it is assumed that the operator operates the pan switch SW1 or the tilt switch SW2 so as to continuously fit the hook image 21G in the frame Ma on the screen 370G of the monitor 370. Then, the attitude angle calculation unit 363 and the coordinate position calculation unit 364 read every detection signal output from the boom attitude detection sensor 50, calculate the coordinate position corresponding to the inclination angle θ and each position on the captured image in the crane coordinate system, and rewrite the work region line U2 in real time.

Therefore, during the hook image 21G is fitted in the frame Ma on the screen 370G of the monitor 370 even while the suspended load is being moved, it is possible to accurately display the work region line U2 on the screen 370G of the monitor 370.

Fourth Embodiment

Figure 19:
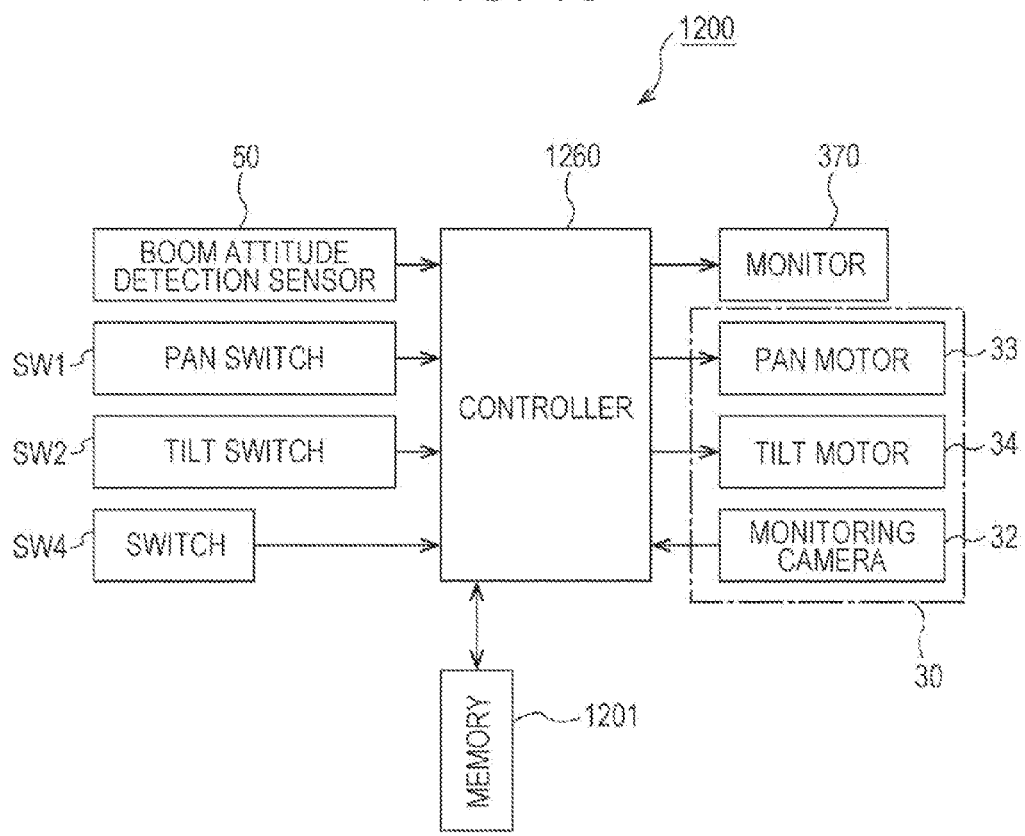
FIG. 19 is a block diagram illustrating a configuration of a work region line display device of a fourth embodiment.

FIG. 19 illustrates a configuration of a work region line display device 1200 of a fourth embodiment. In the fourth embodiment, a reference setting switch (setting means) SW4 and a memory 1201 are provided.

Figure 20:
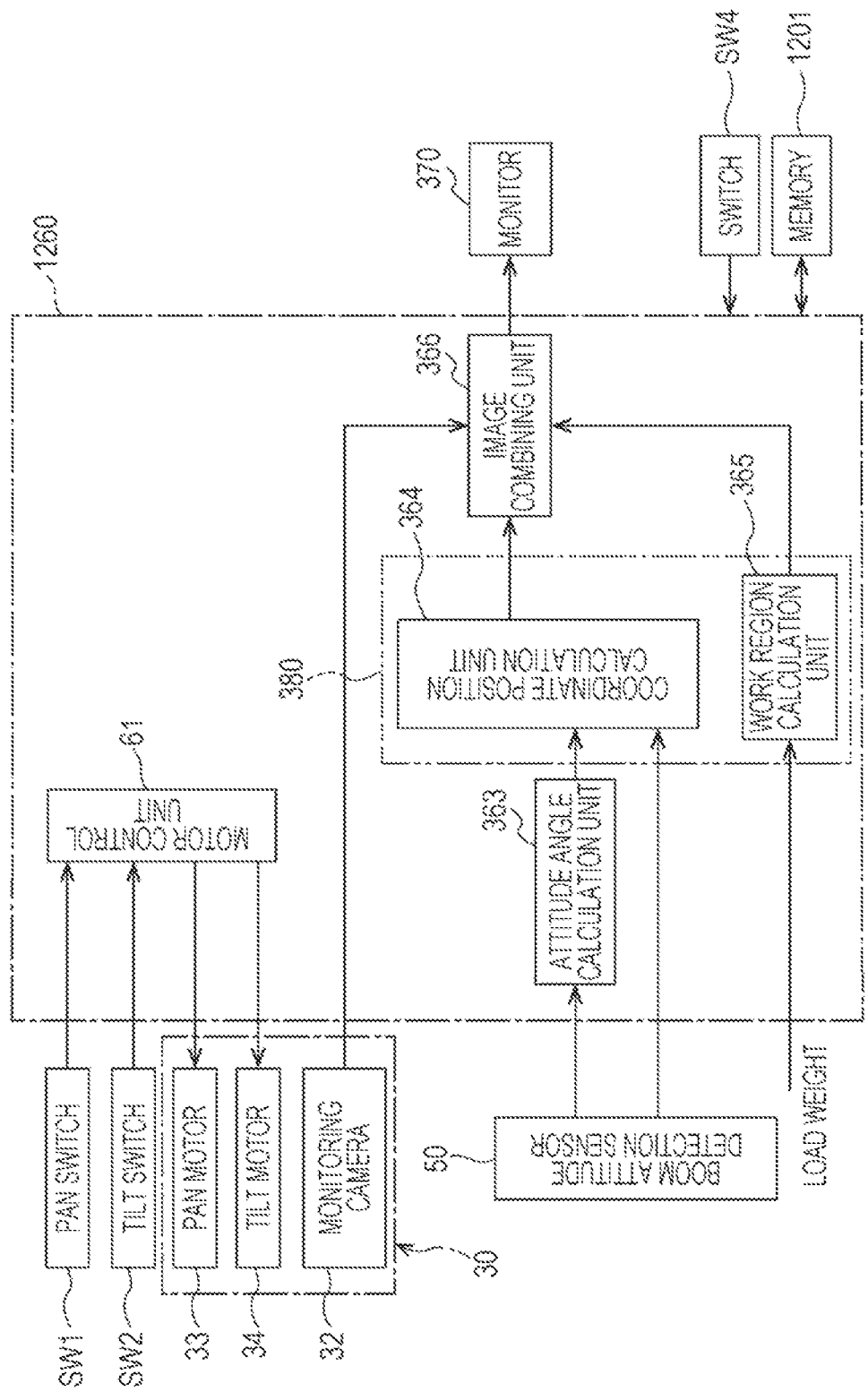
FIG. 20 is a block diagram illustrating a configuration of the work region line display device of the fourth embodiment.

When an operator operates a pan switch SW1 or a tilt switch SW2 and a hook image 21G is fitted in a frame Ma on a screen 370G of a monitor 370 (see FIG. 18), the operator turns the switch SW4 on. When the switch SW4 is turned on, an attitude angle calculation unit 363 of a controller 1260 illustrated in FIG. 20 calculates, similarly to the third embodiment, an inclination angle of an monitoring camera 32 (the angle in the pan and tilt direction) based on a detection signal detected by a boom attitude detection sensor 50.

Furthermore, when the switch SW4 is turned on, an wound-out amount of a hook 21 and an attitude of a telescopic boom 16 (the length, derricking angle, and swivel angle of the telescopic boom 16) which are the detection signal detected by the boom attitude detection sensor 50, and the inclination angle of the monitoring camera 32 (the angle in the pan and tilt direction) calculated by the attitude angle calculation unit 363 at this time are stored in the memory 1201 as a reference value.

Furthermore, by turning the switch SW4 on, a calculation unit, which is not illustrated, of the controller 1260 calculates, similarly to the third embodiment, an actual load weight. Then, a work region calculation unit 365 illustrated in FIG. 20 calculates a work region line U2 (see FIG. 18) based on the actual load weight, and the inclination angle θ of the monitoring camera 32 and the attitude of the telescopic boom 16 which are stored in the memory 1201.

On the other hand, a coordinate position calculation unit 364 calculates, similarly to the third embodiment, the coordinate position corresponding to each position on the captured image in the crane coordinate system. Furthermore, an image combining unit 366 combines the work region line U2 calculated by the work region calculation unit 365 being mapped on the coordinate position in crane coordinate system calculated by the coordinate position calculation unit 364, and displays the combined image on the monitor 370 (see FIG. 18).

In other words, in the fourth embodiment, it is assumed that the hook image 21G is being fitted in the frame Ma on the screen 370G of the monitor 370 after the switch SW4 is turned on, and the work region line U2 is continuously displayed. In the fourth embodiment, the pan switch SW1 or the tilt switch SW2 is not operated.

Due to the change of the attitude of the telescopic boom 16, and raising or lowering the hook 21 by the winch, when the hook image 21G deviates by a predetermined amount from the frame Ma on the screen 370G of the monitor 370, that is, when the wound-out amount of the hook 21 and the attitude data of the telescopic boom 16 (the length and derricking angle of the telescopic boom 16), which are detected by the boom attitude detection sensor 50, are shifted by a predetermined value or more from a reference value stored in the memory 1201, it is determined that the error of the positional shift with respect to the image displaying the work region line U2 is large, and an error display is performed. The error display is performed by, for example, displaying characters on the monitor 370, changing the color of the frame Ma, or flickering or removing the work region line U2.

By performing the error display, the operator can recognize that the displayed work region line is wrong.

According to the fourth embodiment, when the operator operates the telescopic boom 16 and the winch after positioning the hook image 21G in the frame Ma on the screen 370G, the controller 1260 can determine whether the hook image 21G is positioned in the frame Ma on the screen 370G, that is, at a predetermined position of the screen 370G. Furthermore, it is possible to obtain an effect similar to the third embodiment.

Fifth Embodiment

A work region line display device (not illustrated) of a fifth embodiment has a configuration similar to the work region line display device 1200 of the fourth embodiment, and the description thereof is omitted.

Thereafter, when an operator operates a pan switch SW1 or a tilt switch SW2, an error of a work region line U2 becomes large, and an error display is performed.

Since the operator operates the pan switch SW1 or the tilt switch SW2 and thereby the error of the work region line U2 becomes large, the work region line display device of the fifth embodiment performs the error display. Furthermore, the operator is informed in advance not to operate the pan switch SW1 or the tilt switch SW2 after turning a switch SW4 on.

Furthermore, when the winch is only driven after the switch SW4 is turned on, only a hook 21 is raised or lowered, and an hook image 21G deviates from a frame Ma on a screen 370G of a monitor 370. However, the work region line U2 is continuously displayed at the precise position on the screen 370G of the monitor 370 as long as the pan switch SW1 or the tilt switch SW2 is operated.

Unless the error display is performed by turning the pan switch SW1 or the tilt switch SW2 on, the operator can operates the crane under the precise work region line display.

According to the fifth embodiment, when the operator operates the telescopic boom 16 and the winch after positioning the hook image 21G in the frame Ma on the screen 370G, the controller 1260 can determine whether the hook image 21G is positioned in the frame Ma on the screen 370G, that is, at the predetermined position on the screen 370G. Furthermore, it is possible to obtain an effect similar to the third embodiment.

Sixth Embodiment

A work region line display device (not illustrated) of a sixth embodiment have a configuration similar to the work region line display device 1200 of the fourth embodiment, and the description thereof is omitted.

When a pan switch SW1 or a tilt switch SW2 is operated after a switch SW4 is turned on, the work region line display device of the sixth embodiment considers the operation as the operation to fit a hook image 21G (see FIG. 18) on a monitor 370 (see FIG. 19) in a frame Ma, sequentially calculates, similarly to the fourth embodiment, a work region line U2, and rewrites the work region line U2 displayed on the monitor 370 in real time.

In the sixth embodiment, an operator is informed in advance to operate the pan switch SW1 or the tilt switch SW2 so as to fit the hook image 21G in the frame Ma after the switch SW4 is turned on.

The operator can recognize that the precise work region line is displayed by performing the operation other than pan/tilt operation of the camera or performing the pan/tilt operation to fit the hook 21 in the frame Ma.

In any of the above described third embodiment to sixth embodiment, the inclination angle θ of the monitoring camera 32 has been calculated from the length La and the offset amount W1 illustrated in FIG. 17. However, the inclination angle of the monitoring camera 32 may be calculated from the position on the image of the hook image 21G and the length La by the image processing. In this case, the hook image 21G is not required to be fitted in the frame Ma. Furthermore, the frame Ma is not required to be displayed.

Furthermore, the pan motor 33 and the tilt motor 34 may be controlled so as to automatically fit the hook image 21G in the frame Ma by the image processing.

With the sixth embodiment, an effect similar to the third embodiment can be obtained.

Seventh Embodiment

Figure 21:
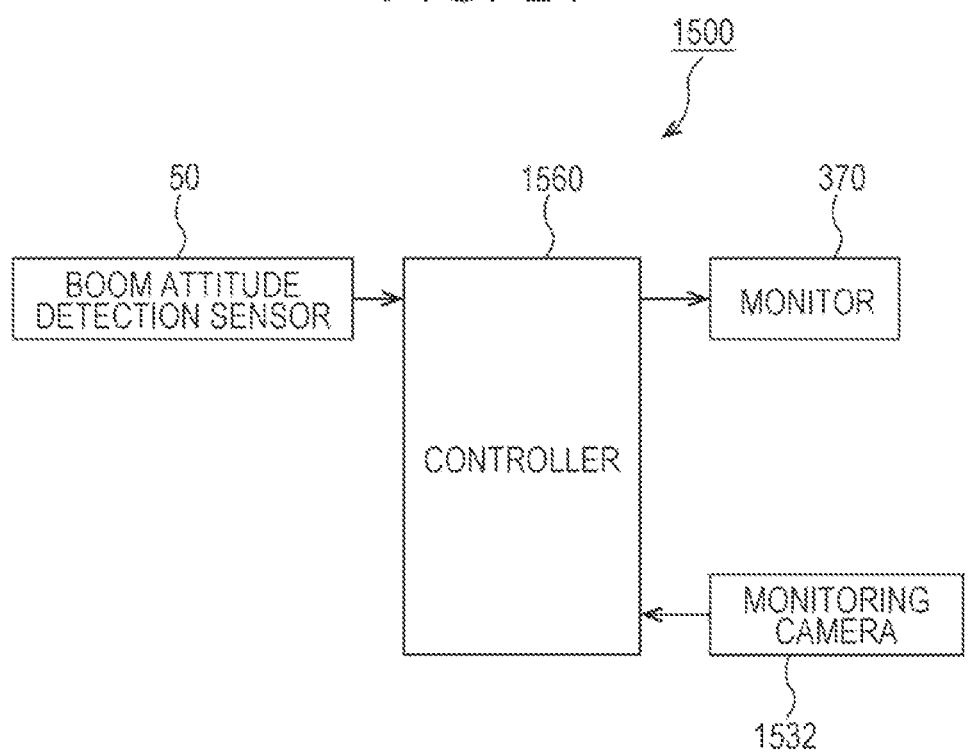
FIG. 21 is a block diagram illustrating a configuration of a work region line display device of a fifth embodiment.

FIG. 21 illustrates a configuration of a work region line display device 1500 of a seventh embodiment. The work region line display device 1500 includes a monitoring camera 1532 which does not have a pan/tilt function. The monitoring camera 1532 is provided in a housing 31 (see FIG. 1), and the housing 31 is mounted on a tip of a top boom 16C through a damper (not illustrated), whereby the monitoring camera 1532 faces directly downward by its own weight.

Figure 22:
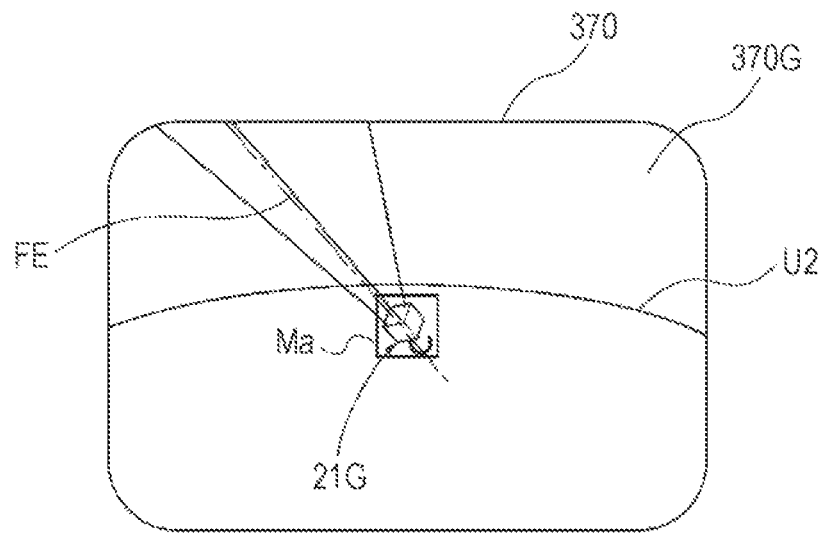
FIG. 22 is an explanatory diagram illustrating a monitor screen of a work region line display device of a seventh embodiment.

When the monitoring camera 1532 faces directly downward, a locus FE of a hook image 21G when a hook 21 is raised or lowered is combined and displayed on a screen 370G of a monitor 370 as illustrated in FIG. 22.

When the monitoring camera 1532 does not face directly downward due to the action of the damper, the hook image 21G deviates from the locus FE, and it is recognized that the displayed work region line U2 is incorrect.

Figure 23:
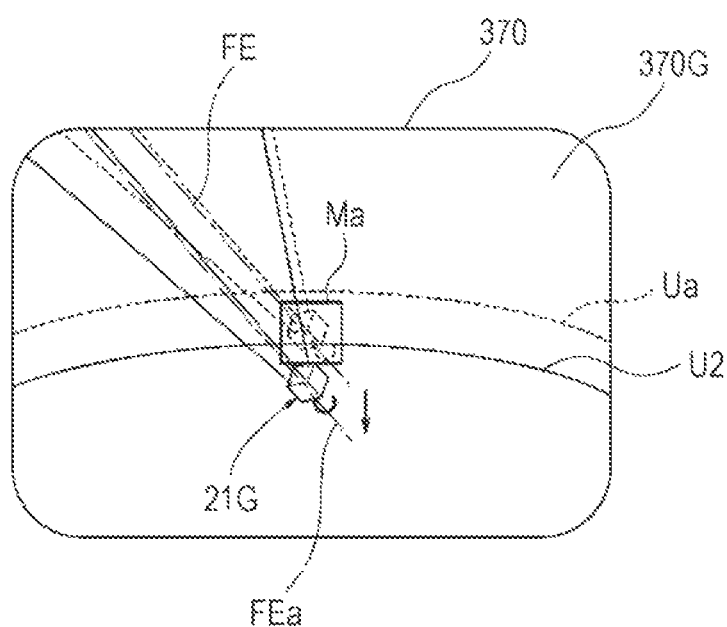
FIG. 23 is an explanatory diagram illustrating a monitor screen of another example.

When a rotating shaft 32J of the monitoring camera 1532 and a center D1 of a sheave are offset as illustrated in FIG. 17, the position of the locus FE is changed according to the derricking angle of a telescopic boom 16. Therefore, as illustrated in FIG. 23, the position of the locus FE may be changed to FEa according to the derricking angle. In this case, the work region line U2 is changed to a precise work region line Ua according to the derricking angle.

Note that, although it is described that the present embodiment does not have the pan/tilt function, the pan/tilt function is provided in the monitoring camera 1532, and the monitoring camera 1532 is paned or tilted so as to position the hook image 21G on the above described loci FE and FEa, whereby the monitoring camera 1532 can face directly downward, and the work region lines U2 and Ua displayed on the monitor 370 are the precise work region lines.

With the above configuration, the operation to fit the hook image 21G on the monitor 370 in the frame Ma is not required, and it is only required to operate the monitoring camera 1532 so as to coincide with the locus FE, whereby the operation is facilitated.

In either of the above described third embodiment to seventh embodiment, although the frame Ma is displayed in the center of the screen 370G of the monitor 370, the frame Ma is necessarily displayed in the center of the screen 370G, and furthermore, the frame Ma may not be displayed. For example, a cross mark may be displayed.

The present invention is not limited to the above described embodiments, and modifications or additions of the design can be made without departing from the gist of the invention according to each claim in the claims.

The invention claimed is:

1. A camera attitude detection device comprising:
    a camera provided at a tip of a boom of a working machine;
    a monitor configured to display an image, captured by the camera, of a hook suspended from the tip of the boom; and
    an attitude angle calculation device configured to calculate, based on hook image position information on a screen displayed on the monitor and hook position information in a real space, an attitude angle of the camera, wherein
        the hook image position information comprises a hook position on a screen actually displayed on the monitor and a reference hook position of the hook on the screen displayed on the monitor associated with a reference condition of when the camera is facing directly downward,
        the hook position information in the real space comprises a distance in a height direction between the camera and the hook, and
        the attitude angle calculation device is implemented via at least one processor.

2. The camera attitude detection device according to claim 1, wherein
    the camera attitude detection device comprises reference hook position calculation means for calculating the reference hook position,
    the attitude angle calculation device comprises:
        a hook position calculation unit configured to calculate a hook position on the screen of the monitor;
        a shift amount calculation unit configured to calculate a shift amount between the hook position on the screen calculated by the hook position calculation unit and the reference hook position calculated by the reference hook position calculation means; and
        camera attitude angle calculation means for calculating the attitude angle of the camera based on the shift amount calculated by the shift amount calculation unit and the distance in the height direction between the camera and the hook,
    wherein the reference hook position calculation means, the hook position calculation unit, the shift amount calculation unit, and the camera attitude angle calculation means are each implemented via at least one processor.

3. The camera attitude detection device according to claim 2, wherein the distance in the height direction is calculated from an attitude angle of the boom and an unwound amount of the hook.

4. The camera attitude detection device according to claim 2, further comprising:
an image recognition unit configured to extract a hook image displayed on the monitor and calculate a size of the extracted hook image, wherein
the distance in the height direction is calculated based on the size of the hook image calculated by the image recognition unit, and
the image recognition unit is implemented via at least one processor.

5. The camera attitude detection device according to claim 2, further comprising:
a touch panel attached on the screen of the monitor, wherein
the hook position calculation unit calculates the hook position on the screen of the monitor based on a touching, by a user through the touch panel, of a position on the touch panel associated with the hook image displayed on the monitor.

6. The camera attitude detection device according to claim 2, wherein the hook position on the screen of the monitor is recognized by performing image processing to the hook image displayed on the monitor and calculated as a center position of the recognized hook image.

7. The camera attitude detection device according to claim 1, wherein
the hook image position information indicates that the camera is inclined to position the hook image at a set position on the screen,
the hook position information comprises information regarding an unwound amount of the hook when the hook image is positioned at the set position, an offset amount between a turn supporting position of the camera and a center of a sheave provided at the tip of the boom, and a derricking angle of the boom, and
the attitude angle calculation device calculates the attitude angle of the camera based on the unwound amount of the hook, the offset amount of the camera, and the derricking angle of the boom.

8. A work region line display device comprising:
a work region calculation device configured to calculate, based on a load weight of a suspended load suspended by the hook, a work region line indicating a region where the suspended load is movable;
an image combining unit configured to combine the work region line calculated by the work region calculation device on an image captured by the camera, the image combined by the image combining unit being displayed on the monitor; and
the camera attitude detection device according to any one of claims 1 to 7, wherein
the work region calculation device calculates, based on an attitude angle of the camera detected by the camera attitude detection device, a precise position of the work region line on the image,
the image combining unit combines the work region line on the precise position calculated by the work region calculation device and displays the combined image on the monitor, and
the work region calculation device, the image combining unit, and the camera attitude detection device are each implemented via at least one processor.

9. The camera attitude detection device according to claim 1, further comprising:
attitude operation means for operating an attitude of the camera so as to position the hook displayed on the monitor at a predetermined position on the screen, wherein
the attitude angle calculation device comprises calculation means for calculating the attitude angle of the camera based on position information of the hook when the hook is positioned at the predetermined position on the screen and position information of the tip of the boom, and
the attitude operation means is implemented via at least one processor.

10. A work region line display device comprising the camera attitude detection device according to claim 9, the work region line display device comprising:
a work region calculation device configured to calculate, based on a load weight of a suspended load to be suspended by the hook, a work region line indicating a region where the suspended load is movable; and
an image combining unit configured to combine the work region line calculated by the work region calculation device on an image captured by the camera, wherein
the work region calculation device calculates, based on the attitude angle of the camera detected by the camera attitude detection device, a precise position of the work region line on the image,
the image combining unit combines the work region line on the precise position calculated by the work region calculation device and displays the combined image on the monitor, and
the work region calculation device and the image combining unit are each implemented via at least one processor.

11. The work region line display device according to claim 10 further comprising:
setting means for setting, when the hook is positioned at a predetermined position of the screen of the monitor by operating the attitude operation means, the position of the hook and the attitude angle of the camera at this time as a reference value, and
after the reference value is set by the setting means, when determining, based on the attitude of the boom and operation of a winch to wind up/wind out the hook, that the position of the hook deviates from a predetermined position of a monitor screen by predetermined distance, the work region calculation device determines that an error occurs,
wherein the setting means is implemented via at least one processor.

12. The work region line display device according to claim 10 further comprising:
setting means for setting, when the hook is positioned at the predetermined position on the screen of the monitor by operating the attitude operation means, the position of the hook and the attitude angle of the camera at this time as a reference value, wherein
the work region calculation device calculates a precise position of the work region line on the image from the reference value set by the setting means, and determines that an error occurs when the camera is operated by the attitude operation means, and
the setting means is implemented via at least one processor.

13. The work region line display device according to any one of claims 10 to 12, wherein
a frame indicating the predetermined position of the screen of the monitor is displayed, and the attitude operation means is operated so as to position the hook in the frame.

14. The work region line display device according to claim 13, wherein
when the camera is operated by the attitude operation means after the work region line is displayed, the camera attitude detection device considers that operation to fit the hook in the frame is performed, and calculates, based on the position information of the hook and the position information of the tip of the boom, the attitude angle of the camera, and
the work region calculation device recalculates, according to the attitude angle of the camera calculated by the camera attitude detection device, a precise position of the work region line on the image, and rewrites the work region line to the recalculated position.

15. The work region line display device according to any one of claims 10 to 12, wherein the predetermined position is a center position of the screen of the monitor.

16. The work region line display device according to any one of claims 10 to 12, wherein the position information of the hook comprises information on an unwound amount of the hook and the attitude of the boom.

* * * * *